United States Patent
Beall et al.

(10) Patent No.: US 12,102,962 B2
(45) Date of Patent: Oct. 1, 2024

(54) COMPOSITE STRUCTURES, HEATER APPARATUS, FAST LIGHT-OFF EXHAUST AFTERTREATMENT SYSTEMS, AND METHODS OF MANUFACTURING AND USING SAME

(71) Applicant: CORNING INCORPORATED, Corning, NY (US)

(72) Inventors: Douglas Munroe Beall, Painted Post, NY (US); Vishwanath Ganpat Deshmane, Chesterbrook, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/117,112

(22) Filed: Mar. 3, 2023

(65) Prior Publication Data

US 2023/0201771 A1    Jun. 29, 2023

Related U.S. Application Data

(62) Division of application No. 17/387,275, filed on Jul. 28, 2021, now Pat. No. 11,628,401.

(51) Int. Cl.
*B01D 53/24* (2006.01)
*B01D 53/94* (2006.01)
(Continued)

(52) U.S. Cl.
CPC ......... *B01D 53/9454* (2013.01); *F01N 3/035* (2013.01); *H05B 3/00* (2013.01);
(Continued)

(58) Field of Classification Search
CPC ........ B01D 53/9454; B01D 2255/1021; B01D 2255/1023; B01D 2255/1025;
(Continued)

(56) References Cited

U.S. PATENT DOCUMENTS

| 3,581,489 A | 6/1971 | Camin et al. |
| 5,259,190 A | 11/1993 | Bagley et al. |

(Continued)

FOREIGN PATENT DOCUMENTS

| EP | 2692714 A1 | 2/2014 |
| JP | 3237364 B2 | 12/2001 |

(Continued)

OTHER PUBLICATIONS

International Search Report and Written Opinion of the International Searching Authority; PCT/US2022/038439; dated Nov. 21, 2022; 18 pages; European Patent Office.

*Primary Examiner* — Shawntina T Fuqua
(74) *Attorney, Agent, or Firm* — Kurt R. Denniston

(57) ABSTRACT

A composite structure, exhaust aftertreatment system, and method of manufacture. The composite structure includes a body that includes an array of intersecting walls that form a plurality of channels extending in an axial direction through the body such that adjacent channels are located on opposite sides of each wall. A composite material of the body includes a first phase of a porous glass or ceramic containing material. The first phase includes an internal interconnected porosity. A second phase of an electrically conductive material is included that is a continuous, three-dimensional, interconnected, electrically conductive phase at least partially filling the internal interconnected porosity of the first phase, which creates an electrical path through at least some of the walls in a lateral direction perpendicular to the axial direction between the opposite sides of the walls.

18 Claims, 9 Drawing Sheets

(51) Int. Cl.
*F01N 3/035* (2006.01)
*H05B 3/00* (2006.01)
*H05B 3/12* (2006.01)

(52) U.S. Cl.
CPC ............ *H05B 3/12* (2013.01); *F01N 2250/02* (2013.01); *F01N 2330/04* (2013.01); *F01N 2330/06* (2013.01); *F01N 2330/14* (2013.01); *F01N 2330/34* (2013.01); *F01N 2370/02* (2013.01); *H05B 2203/006* (2013.01); *H05B 2203/017* (2013.01); *H05B 2203/024* (2013.01)

(58) Field of Classification Search
CPC ........ B01D 2255/104; B01D 2255/106; B01D 2255/2073; B01D 2255/407; B01D 2255/90; F01N 3/035; F01N 3/0222; F01N 2250/02; F01N 2330/04; F01N 2330/06; F01N 2330/14; F01N 2330/34; F01N 2370/02; F01N 2210/16; H05B 3/00; H05B 3/12; H05B 3/342; H05B 2203/006; H05B 2203/017; H05B 2203/024; H05B 2203/013; H05B 2203/022

See application file for complete search history.

(56) References Cited

U.S. PATENT DOCUMENTS

| | | |
|---|---|---|
| 5,393,499 A | 2/1995 | Bagley et al. |
| 5,569,455 A | 10/1996 | Fukui et al. |
| 9,657,622 B2 | 5/2017 | Crawford et al. |
| 10,590,818 B2 | 3/2020 | Crawford et al. |
| 2014/0011664 A1 | 1/2014 | Furukawa et al. |
| 2015/0075137 A1* | 3/2015 | Crawford ............... H05B 6/108 60/274 |

FOREIGN PATENT DOCUMENTS

| | | | |
|---|---|---|---|
| JP | 2011194382 A | * 10/2011 | |
| JP | 2019-162612 A | 9/2019 | |
| WO | WO-2022115349 A1 | * 6/2022 | ........... F01N 3/2013 |

\* cited by examiner

COMPOSITE STRUCTURES, HEATER APPARATUS, FAST LIGHT-OFF EXHAUST AFTERTREATMENT SYSTEMS, AND METHODS OF MANUFACTURING AND USING SAME

CROSS REFERENCE TO RELATED APPLICATION

This application is a Divisional of U.S. patent application Ser. No. 17/387,275 filed on Jul. 28, 2021, the content of which is relied upon and incorporated herein by reference in its entirety.

FIELD

The present specification relates to composite structures, such as for fluid aftertreatment apparatuses and systems, e.g., exhaust treatment systems having an electric heater therein.

BACKGROUND

The first several seconds after cold start may contribute disproportionally to total emissions during operation of an engine equipped with a catalyst-containing exhaust aftertreatment component, such as a catalytic converter. Thus, early or fast light-off of the catalyst in the exhaust aftertreatment system may be beneficial in reducing such cold start emissions. The reduction of cold start emissions may be particularly useful in efforts to meet increasing strict environmental air quality and/or exhaust emissions regulations, such as automobile exhaust emissions regulations.

SUMMARY

In one or more embodiments of the disclosure a composite structure is provided, comprising a body comprising an array of intersecting walls that form a plurality of channels extending in an axial direction through the body such that adjacent channels are located on opposite sides of each wall, wherein a composite material of the body comprises: a first phase of a porous glass or ceramic containing material, wherein the first phase comprises an internal interconnected porosity; and a second phase of an electrically conductive material, wherein the second phase is a continuous, three-dimensional, interconnected, electrically conductive phase at least partially filling the internal interconnected porosity of the first phase to create an electrical path through at least some of the walls in a lateral direction perpendicular to the axial direction between the opposite sides of the walls.

In some embodiments, the electrically conductive material comprises a sintered metal phase.

In some embodiments, the second phase creates an electrical connection across the body between opposite sides of the body in the lateral direction perpendicular to the axial direction of the body.

In some embodiments, the second phase also creates an electrical connection between opposing axial faces of the body.

In some embodiments, the second phase is also formed at least partially along exterior surfaces of the walls.

In some embodiments, the second phase comprises greater than or equal to 10% of a solid volume of the composite structure.

In some embodiments, the first phase constitutes from 25% to 90% of a solid volume of the composite structure, and the second phase constitutes from 10% to 75% of the solid volume of the composite structure.

In some embodiments, the electrically conductive material of the second phase is an electrically conductive metal.

In some embodiments, the electrically conductive metal comprises an Fe-containing alloy an Fe-, Cr-, and Al-containing alloy, or a nickel-chromium containing alloy.

In some embodiments, the second phase incompletely fills the internal, interconnected porosity of the first phase and leaves residual open porosity in the walls.

In some embodiments, a catalyst material is disposed on the walls, in an open porosity of the walls, or both.

In some embodiments, the porous glass or ceramic-containing material comprises cordierite, aluminum titanate, alumina, silicon carbide, silicon nitride, mullite, sappherine, spinel, calcium aluminate, zirconium phosphate, β-spodumene, β-eucryptite(LiAlSiO4), a cordierite-glass ceramic, fused silica, doped fused silica, or combinations thereof.

In some embodiments, the composite material comprises an electrical conductivity of between 15 S/cm and 300 S/cm.

In some embodiments, the electrically conductive material of the second phase has an electrical resistivity of less than $1.2 \times 10-6$ Ohm-m.

In some embodiments, the second phase is present in the internal, interconnected porosity at a loading level of at least 200 g/L with respect to a representative volume of the composite structure, wherein the representative volume is determined as a closed frontal area of the first phase, inclusive of the internal interconnected porosity, multiplied by an axial length of the first phase.

In some embodiments, the loading level is at least 1,200 g/L of the representative volume of the composite structure.

In some embodiments, the loading level is at least 150 cm3/L of the representative volume of the composite structure.

In some embodiments, the composite structure comprises cutout portions that create a serpentine pattern for the array of walls by separating portions of the walls from each other.

In some embodiments, the electrical conductivity is from 1,000 S/cm to 2,500 S/cm.

In some embodiments, the internal, interconnected porosity of the first phase, absent the second phase, comprises: an average bulk porosity of the internal, interconnected porosity from 40% to 80%; and a median pore size from 5 μm to 40 μm.

In some embodiments, an exhaust aftertreatment system comprises a heater assembly comprising the composite structure of any of the above embodiments arranged as a resistive heater element, and an exhaust aftertreatment component positioned adjacent to the heater assembly.

In some embodiments, the exhaust aftertreatment component is a catalyzed substrate or a particulate filter.

In some embodiments, a composite structure, comprises a honeycomb body of intersecting walls forming a plurality of channels, wherein a composite material of the body comprises: a first phase of a porous glass or ceramic containing material, wherein the first phase comprises an internal interconnected porosity having a porosity of 40% to 80% and a median pore size from 5 μm to 40 μm; and a second phase of an electrically conductive material, wherein the second phase is present in the internal, interconnected porosity at a loading level of at least 25 cm3/L with respect to a representative volume of the composite structure, wherein the representative volume is determined as a closed frontal area of the first phase, inclusive of the internal interconnected porosity, multiplied by an axial length of the first phase; wherein the first phase constitutes from 25% to 90% of a solid volume of the composite structure, and the second phase constitutes from 10% to 75% of the solid volume of the composite structure.

In some embodiments, a method of manufacturing a composite structure, comprises subjecting a base structure comprising a porous material to an electrically conductive particle-containing slurry to form a particle-loaded body by depositing the electrically conducting particles at least within the interconnected porosity at a loading level of at least 200 g/L with respect to a representative volume of the composite structure, wherein the representative volume is determined as a closed frontal area of the base structure multiplied by an axial length of the base structure.

In some embodiments, the method comprises firing the particle-loaded body to sinter the electrically conductive particles together into a continuous, three-dimensional, interconnected, electrically conductive phase located within the interconnected porosity of the base structure.

In some embodiments, the method comprises subjecting the plurality of channels to the electrically conductive particle-containing slurry multiple times followed by drying after each of the multiple times, wherein all the subjecting and drying occurs prior to firing.

In some embodiments, the electrically conductive particle-containing slurry contains conductive metal particles.

In some embodiments, the conductive metal particles have a median particle size of less than or equal to 25 µm.

In some embodiments, the composite structure comprises an electrical conductivity measured between opposing lateral sides in a direction perpendicular to an axial direction of greater than 25 S/cm.

In some embodiments, the method comprises firing of the particle-loaded body at a temperature from 1,200° C. to from 1,450° C. to sinter the electrically conductive particles.

Numerous other features and aspects are provided in accordance with these and other embodiments of the disclosure. Further features and aspects of embodiments will become more fully apparent from the following detailed description, the claims, and the accompanying drawings.

BRIEF DESCRIPTION OF THE DRAWINGS

The accompanying drawings are included to provide a further understanding of the disclosure and are incorporated in and constitute a part of this specification, illustrate embodiments of the disclosure and together with the description serve to explain the disclosure.

DETAILED DESCRIPTION

Figure 1A:
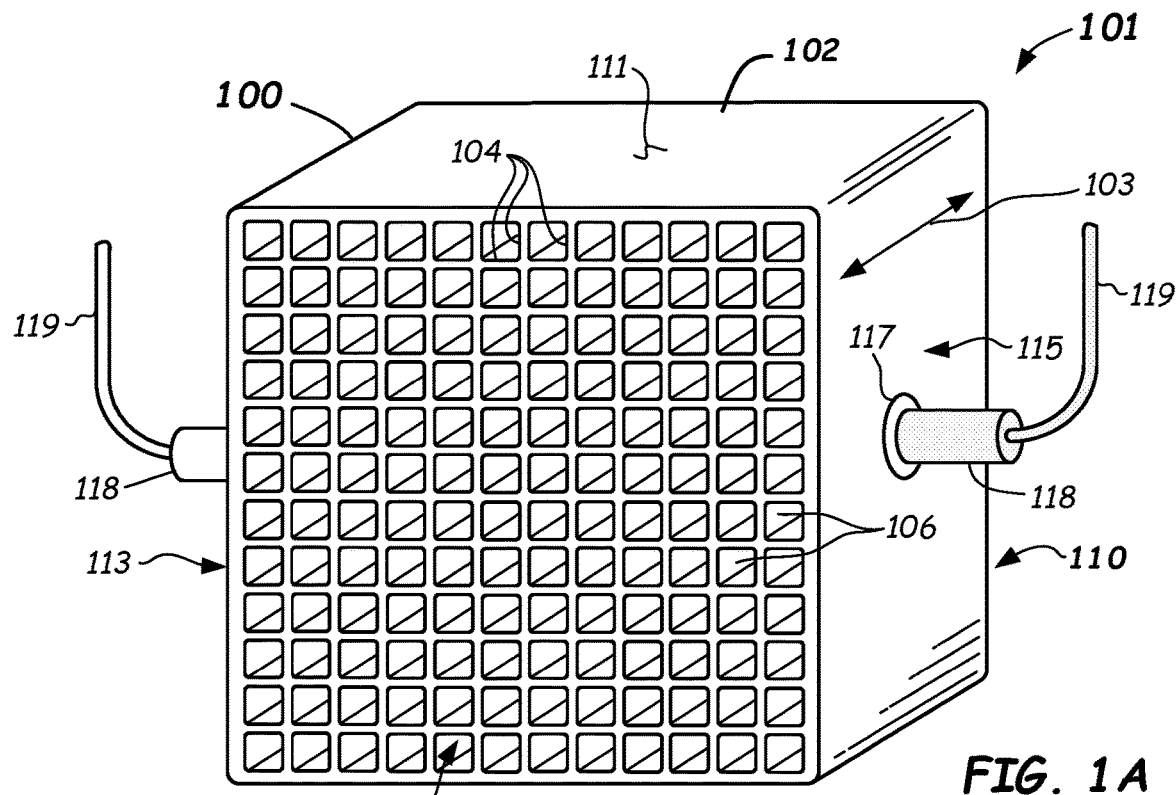
FIG. 1A schematically illustrates a perspective view of a composite structure that may be embodied as part of an exhaust heater according to one or more embodiments of the disclosure.

Electrical heaters and electrically heated catalyst systems (EHCs) provide possible approaches to enable earlier light-off times than aftertreatment systems that rely on the heat of the engine exhaust to sufficiently raise the temperature of the catalyst to trigger light off, and thus present opportunities to further reduce cold-start emissions and total tail pipe emissions. Such electrical heaters and EHCs may have further application for diesel or other engines where the engine exhaust temperatures are cooler than, for example, in gasoline engine applications. Additionally, electrical heaters and EHCs may be beneficial in hybrid automobiles (having both an internal combustion engine and an electric motor), since the internal combustion engine may frequently experience a cold start condition as the automobiles continuously transitions back and forth between the electric motor and the internal combustion engine. In such applications, faster light-off time is of interest. Also of interest may be steady-state applications where the exhaust is continually or periodically heated in order to increase regeneration of soot and/or to increase catalyst activity, such as when selective catalyst reduction (SCR) catalysts are employed.

However, any component used in an aftertreatment of engine exhaust, such as the aforementioned, heaters and EHCs must be able to withstand harsh conditions, such as extreme thermal cycling, constant vibrations, and exposure to a wet environment. Thus, in accordance with one or more embodiments described herein, a composite structure is provided that can offer high strength, high durability, and resistances to heat, oxidation, and corrosion. Such composite structures may be used as part of an exhaust aftertreatment system. In particular, such composite structures may be embodied as heater, for example. The heater may be a separate component to be used in combination with a separate exhaust aftertreatment component, such as a catalyst substrate or a particulate filter, or optionally, the composite structure described herein can be integrally formed as, or with, a catalyst substrate.

In some embodiments, the composite structure comprises a body comprising an array of intersecting walls that form a plurality of channels that extend axially between opposite end faces of the body, e.g., from an inlet face to an outlet face. The walls comprise a composite that comprises a first phase of a porous material that defines an internal, interconnected porosity for the first phase, and a second phase of an electrically conductive material that is impregnated within and/or intertwined with the first phase. In some embodiments, the second phase of electrically conductive material at least partially fills the internal, interconnected porosity of the first phase to extend between opposite surfaces of the walls. In some embodiments, the first phase can be manufactured first as a standalone structure or monolith, and thereby act as a matrix for carrying or supporting the second phase during manufacture.

As described further herein below, the material of the first phase can be generally non-conductive. In some embodiments, the material of the first phase is a porous ceramic, a porous glass-ceramic, or a porous glass material (which may be referred to herein collectively as a "porous glass or ceramic-containing material"). In order to facilitate the creation of a second, electrically conductive phase (described in more detail below), in some embodiments, the porous glass or ceramic-containing material has an average bulk porosity of at least 40%. and/or a median pore size of at least 5 µm, or even at least 10 µm.

The first phase (as a standalone structure, without the second phase) can be formed as, and manufactured substantially in accordance with the manufacture of, a porous ceramic honeycomb body, for example, a ceramic honeycomb body useful as a catalyst substrate or a particulate filter. For example, fluid (e.g., exhaust gas) flow will pass longitudinally (axially) along the channels in a porous ceramic honeycomb body, and also through the internal, interconnected porosity of the porous ceramic material of the walls. Thus, the internal, interconnected porosity of the first phase provides a space into which the second phase of the composite (electrically conductive material) can be disposed to form the second phase as a continuous, three-dimensional, interconnected, phase. In some embodiments, the first phase can be manufactured first and thereby act as a substrate or matrix for carrying or supporting the second phase during manufacture. The continuous, three-dimensional, interconnected, phase can be made from a generally conductive material, such as a metal or metal-containing material (which may be referred to herein collectively as a "metal material"). Accordingly, in some embodiments the composite structure is formed by impregnating or infiltrating the porosity of a porous ceramic honeycomb body (first phase) with a metal-containing material (second phase).

In some embodiments, the metal material is a sintered metal, e.g., created by sintering together of metal particles that have been deposited within the internal, interconnected porosity of the first phase. Sintering can be performed in an inert environment, such as with the parts in an inert gas, such as nitrogen. In particular, the electrically conductive phase (second phase) is provided at least within the porosity of the first phase, such as at least filling the internal, interconnected porosity of the first phase. In some embodiments, the second phase sufficiently fills the porosity of the first phase so as to extend between opposite surfaces of the walls. In this way, the second phase can be used to create electrical, i.e., current-carrying, paths through the walls of the body of the composite structure. In some embodiments, the metal particles for forming the second phase are deposited at an average loading level of at least 200 g/L, with respect to a representative total volume as described in more detail herein. In general, the representative volume corresponds to the volume of both the solid matter of the first phase and the internal, interconnected porosity. In this way, when the first phase is formed from a standalone porous ceramic base structure, for example, the representative volume can thus be determined as the closed frontal area of the base structure multiplied by the axial length of the base structure.

The continuous, three-dimensional, interconnected, electrically conductive phase forms a continuous electrical path within the internal interconnected porosity such that the composite structure as a whole is electrically conductive. As described in more detail herein, forming the second phase such that it extends between opposite surfaces of the walls enables current to be carried not only axially between the end faces of the composite structure, but also laterally across the body in directions perpendicular to the axial direction. For example, if composite structure has a cylindrical shape, the second phase creates an electrical path not only along the longitudinal (axial) length of the cylinder, but also across the diameter of the circular cross-sectional shape of the cylinder (which is laterally in a direction perpendicular to the axial direction). Electrodes attached to the respective opposing lateral sides can be provided and thus allow a voltage potential to be applied by a suitable control system, wherein the electrically conductive second phase operates as a resistive heating element when energized.

Although the composite structures described herein have excellent utility as a heater apparatus (e.g., a catalyst heater in an exhaust aftertreatment system), these composite structures can have other uses as well due to their high strength, durability, and resistance to heat, corrosion, and oxidation. For example, the composite structure may be useful for providing a rigid honeycomb body having excellent compressive strength, as well as improved strength-to-weight properties. For example, the composite structure can exhibit a compression strength of greater than 50 MPa measured in compression on a 1.0 inch×1.0 inch×1.0 inch cube of a honeycomb body having a "300/5" or similar geometry, wherein 300/5 refers to a honeycomb body having 300 cells (channels) per square inch (cpsi) and a wall thickness of 5 mils).

Additional discussions of the glass or ceramic-containing composite structures, exhaust aftertreatment systems including a glass or ceramic-containing composite structure, heater apparatus embodying a glass or ceramic-containing composite structure, and methods of manufacturing and using the glass or ceramic-containing composite structure are provided with reference to FIGS. 1A-10C herein.

Figure 1B:
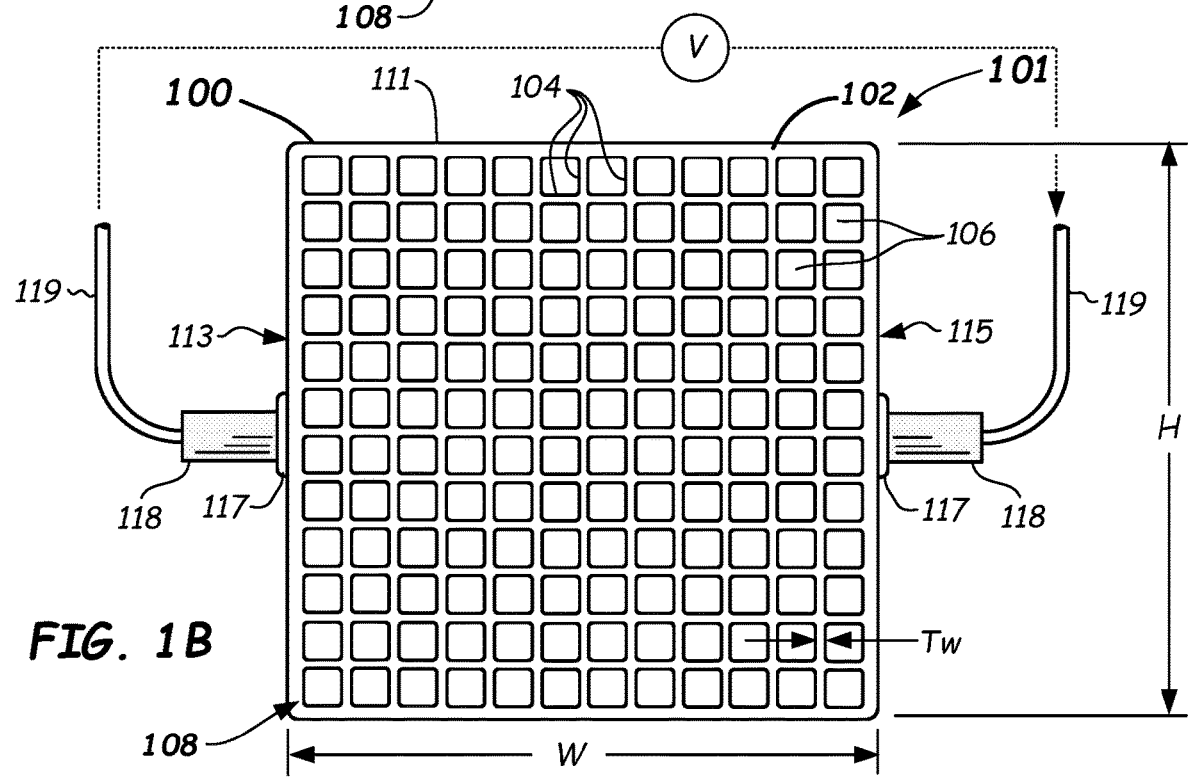
FIG. 1B schematically illustrates a front elevation view showing an inlet end face of the composite structure embodied as part of an exhaust heater of FIG. 1A.

Referring now to FIGS. 1A-1B, a first embodiment of a composite structure 100 according to embodiments of the disclosure is shown. Composite structure 100 as shown is embodied as a heating element for a heater apparatus 101 in FIGS. 1A-1B. Composite structure 100 comprises a body 102 comprising intersecting walls 104 that form a plurality of channels 106 extending axially (longitudinally) through the body 102. The walls 104 are made from a composite material comprises a first phase of porous glass or ceramic-containing material as described herein (e.g., see dark grey areas designated with reference numeral 310 in the microphotographs of FIGS. 3A-3C, and which may be referred to herein as the first phase 310). The composite material of the walls 104 further comprises a second phase of an electrically conductive material, such as a metal-containing material (e.g., see the light grey areas designated with reference numeral 312 in the micrographs of FIGS. 3A-3C, and which may be referred to herein as the second phase 312). As described herein, the second phase (again, light gray areas in FIGS. 3A-3C) at least partially fills the internal interconnected porosity of the first phase 310 (again, dark gray areas in FIGS. 3A-3C). As described herein, the second phase (light grey materials arranged as a three-dimensional, interconnected, electrically conductive phase, to be more described fully herein. The walls 104 can additionally comprise pores or voids (which may become a combination of open and closed porosities due to the presence of the second phase) as the remaining portion of the internal interconnected porosity that is not filled by the second phase (e.g., see the black areas designated with the reference numeral 308 in the microphotographs of FIGS. 3A-3C). Thus, the internal, interconnected porosity 308 of the first phase 310 initially includes (before addition of the second phase 312) both the black (unfilled) areas in FIGS. 3A-3C and the light gray areas that are later occupied by the second phase 312 in FIGS. 3A-3C.

Channels 106 can be parallel to one another and pass between opposing end faces of the body 102. For example, in FIG. 1A, the channels 106 extend axially through the body 102 from an inlet face 108 to an outlet face 110 (e.g., outlet face 110 being substantially similar in shape and dimensions to inlet face 108). The axial direction is represented in FIG. 1A via a line 103. Channels 106 can be of any cross-sectional shape in transverse cross-section, such as rectangular (square being shown), triangular, heptagonal, hexagonal, octagonal, trapezoidal, diamond, circular, ellipsoidal, other polygonal shapes, combinations of any of the aforementioned, and the like. Corners may be appropriately radiused or filleted, e.g., to increase strength, facilitate manufacture, and/or to prevent pooling of any applied washcoat. All of the channels 106 can have the same shape, or the channels 106 can take two or more different shapes. Similarly, the peripheral shape of the body 102 can take any of the aforementioned shapes and/or combinations, including having radiused or filleted corners. The peripheral cross-sectional shape of the body 102 can be generally the same as that of the channels 106 (e.g., a generally rectangular body 102 is shown in FIGS. 1A and 1B having generally rectangular channels 106), or the body 102 and the channels 106 can have different shapes. For example, in other embodiments, the body 102 can have a circular cross-sectional shape with square-shaped channels 106.

A skin 111 providing additional structural support can be formed at the outer periphery of the body 102. Skin 111 can be formed in the same manufacturing processes as the first phase (e.g., co-extruded in accordance with manufacturing techniques for porous ceramic honeycomb) or after-applied (applied to a green honeycomb body or after firing of a green honeycomb body) The outer shape of the composite body 100 can be a rectangular parallelepiped as is shown, and therefore comprises a square or rectangular outer profile when viewed from the inlet end face 108. However, other outer perimeter shapes can be used as described above, such as round, oval, triangular or tri-lobed, polygonal, and the like.

As described herein, in some embodiments the composite structure 100 is embodied as part of heater assembly 101, namely, as a resistive heating element or the heater assembly 101. For example, the continuous, three-dimensional, interconnected, electrically conductive phase 312 can be arranged to provide continuous, three-dimensional, electrically conductive paths laterally across the body (in a direction perpendicular to the axial direction), such as between a first side 113 and an opposite second side 115 of the body 102 as shown in FIGS. 1A-1D. For example, in this embodiment, the electrical connection is formed in a lateral direction corresponding to a width W of the body 102 (labelled in FIG. 1B), which is perpendicular to the axial direction (see line 103 in FIG. 1A indicating the axial direction). Accordingly, electrodes 117 can be attached to the respective opposite sides 113, 115 of the body 102 and the continuous, three-dimensional, interconnected, electrically conductive phase 312 of the composite material of the walls 104 of the body 102 can function as a resistor element. In this way, the body 102 will heat up when an electrical potential (voltage) is applied across the electrodes 117. Thus, the electrically conductive phase 312 being interconnected throughout the internal interconnected porosity 308 of the porous material of the first phase enables electrical current to pass through the walls 104, such that the composite structure 100 is electrically conductive between respective opposing sides 113, 115.

Figure 1C:
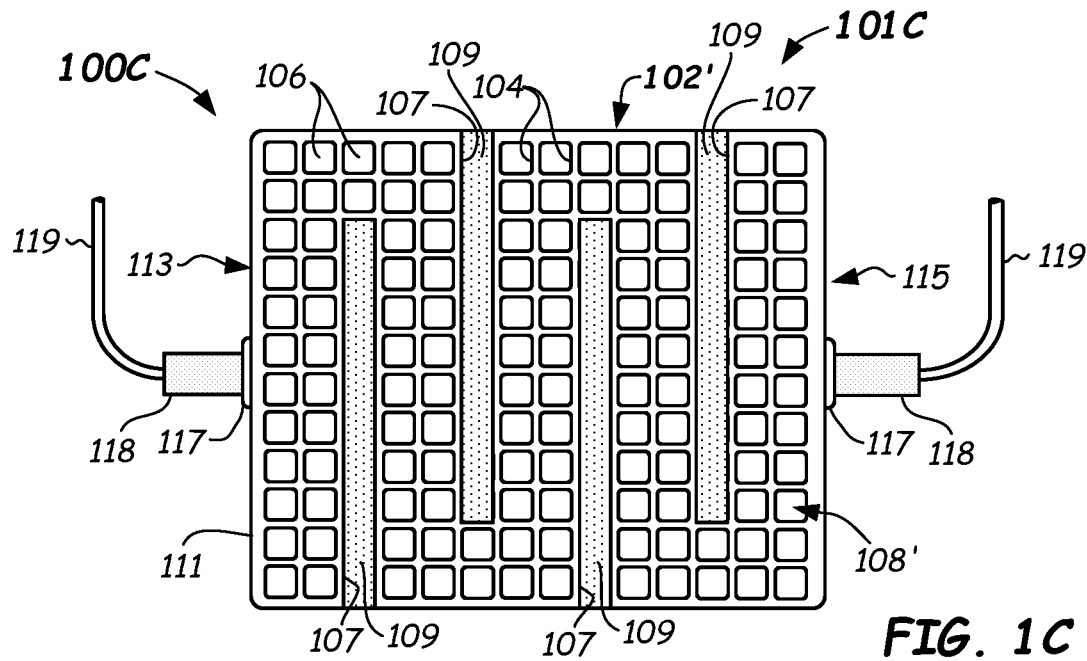
FIGS. 1C and 1D schematically illustrate front elevation views showing an inlet end face of alternative composite structure including serpentine resistive structures according to embodiments of the disclosure.
Figure 1D:
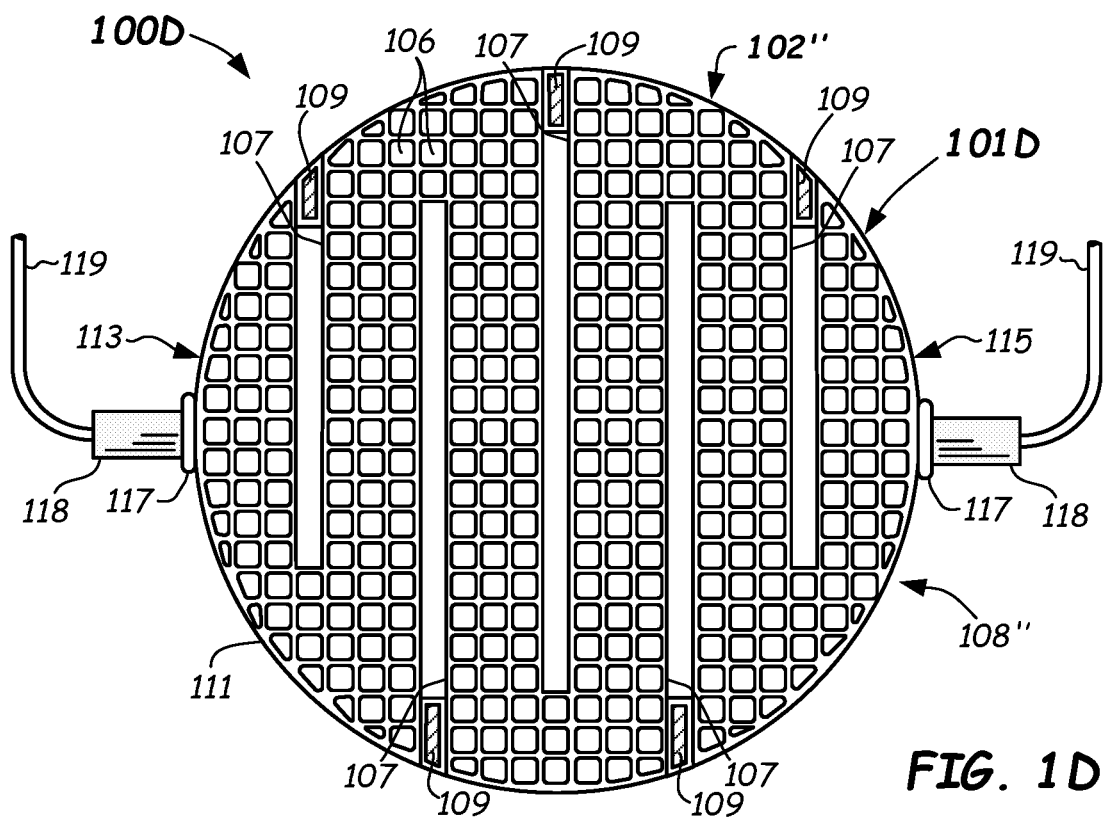

Referring now to FIGS. 1C and 1D, further embodiments are illustrated, in which prime (') and double prime (") symbols are utilized to assist in identification of elements or features similar to those in the embodiments of FIGS. 1A-1B (which share the same base reference numeral), but while facilitating further discussion with respect to the particular features in the embodiments of FIGS. 1C and 1D. Except as indicated otherwise, features or elements having a base reference numeral appended with a prime or double prime symbols are generally arranged and function as described with respect to that element or feature that shares that base reference numeral without any prime or double symbols. For example, inlet end faces 108', 108" of alternative composite structures 100C, 100D (which except as otherwise described, are arranged as described with respect to, and can be manufactured and/or used in accordance with, the composite structure 100) embodied respectively as part of heater apparatuses 101C, 101D (which except as otherwise described, is arranged as described with respect to, and can be manufactured and/or used in accordance with, the heater 101) are shown, which generally resemble inlet face 108 of apparatus 101 in FIGS. 1A-B.

Unlike the embodiment of FIGS. 1A-1B, the bodies 102', 102" of FIGS. 1C and 1D are serpentine resistive structures formed by including cutout portions 107 (e.g., which may be referred to as slits or slots). In other words, the cutout portions 107 cause the walls 104 to form the bodies 102', 102" in generally serpentine shapes, in which portions of the walls 104 extend alternatingly back and forth across the bodies 102', 102". The cutout portions 107 can be formed by first creating a continuous array of the walls 104 (e.g., by extrusion) and then removing the corresponding portion of the walls 104 from the locations at the cutout portions 107 (e.g., by cutting or grinding), or these bodies 102', 102" can be manufactured without walls 104 ever being located in the area of the cutout portions 107 during any stage of manufacture. The cutout portions 107 can be air gaps, or fully or partially filled with an electrically insulating material 109, such as aluminum oxide. In some embodiments, the insulating material 109 is selected to have a coefficient of thermal expansion substantially equal to that of the composite material of the bodies 102', 102".

Similar to the body 102 in FIGS. 1A and 1B, the walls 104 of the bodies 102', 102" form a plurality of channels 106 extending axially through the bodies 102', 102". Also similar to the body 102 in FIGS. 1A and 1B, the bodies 102', 102" of the composite structures 100C, 100D can have walls 104 that comprise a composite material comprising the first phase 310 and second phase 312 as described herein. Accordingly, the composite structure 100C comprises a continuous, three-dimensional, interconnected, electrically conductive phase (the second phase 312) disposed at least within the internal interconnected porosity of a generally non-conductive glass or ceramic-containing phase (first phase 310), in accordance with the embodiment shown in FIGS. 1A-1B and as described herein. An increased current-carrying path length between the electrodes 117, which must serpentine back and forth across the body due to the cutout portions 107, enables the total electrical resistance of the bodies 102', 102" to be made relatively larger as compared to like bodies with no cutout portions 107 (e.g., relative to the body 102 in FIGS. 1A-1B, which does not have the cutout portions 107). The parameters of the cutout portions 107 (e.g., width, length, depth, and/or number) can be used to adjust or tune the total resistance of the 102', 102" to a desired or targeted value (e.g., a resistance that enables a desired or targeted temperature to be achieved when the heater apparatus 100C, 100D are connected to a given power source).

In the embodiment of FIG. 1D, the insulating material 109 can comprise insulators present only at the opened ends of each cutout portion 107 (e.g., which may be referred to as slot separators). For example, these slot separates can comprise coated metal plates. For example, metal plates can be coated with an insulating material, such as alumina. Such insulating material 109 can be located only at the slit opening directly proximate the skin 111 (extending 1-4 channels 106 deep, for example). Other configurations are possible. The insulating material 109 can be any electrically non-conductive and environmentally inert material that can survive usage temperatures.

The glass or ceramic-containing material forming the first phase 310 in the walls 104 can be a porous ceramic material in some embodiments. For example, the porous ceramic material can be cordierite, aluminum titanate, alumina, silica, silicon carbide, silicon nitride, mullite, sappherine, spinel, calcium aluminate, zirconium phosphate, and ceramic combinations of the afore-mentioned. Other suitable porous ceramic materials can be used.

In other embodiments, the glass or ceramic-containing material of the first phase 310 can comprise a porous glass-ceramic material such as β-spodumene, β-eucryptite (LiAlSiO$_4$), a cordierite-glass ceramic, and the like. Other suitable porous glass-ceramic materials can be used, including combinations with the aforementioned ceramic materials.

Alternatively or additionally, the glass or ceramic-containing material of the first phase 310 can be a porous glass material in some embodiments. For example, the first phase can comprise a porous glass honeycomb monolith of silica glass, such as manufactured through extrusion of a glass frit, binder, and a liquid vehicle, such as is taught in U.S. Pat. No. 10,370,304, for example, the relevant contents of which are hereby incorporated by reference. Other suitable porous glass materials such as doped silica glass (e.g., boron-doped silica glass) can be used. Combinations of theses and other suitable ceramic, glass-ceramic, and/or glass materials can be used.

Figure 3A:
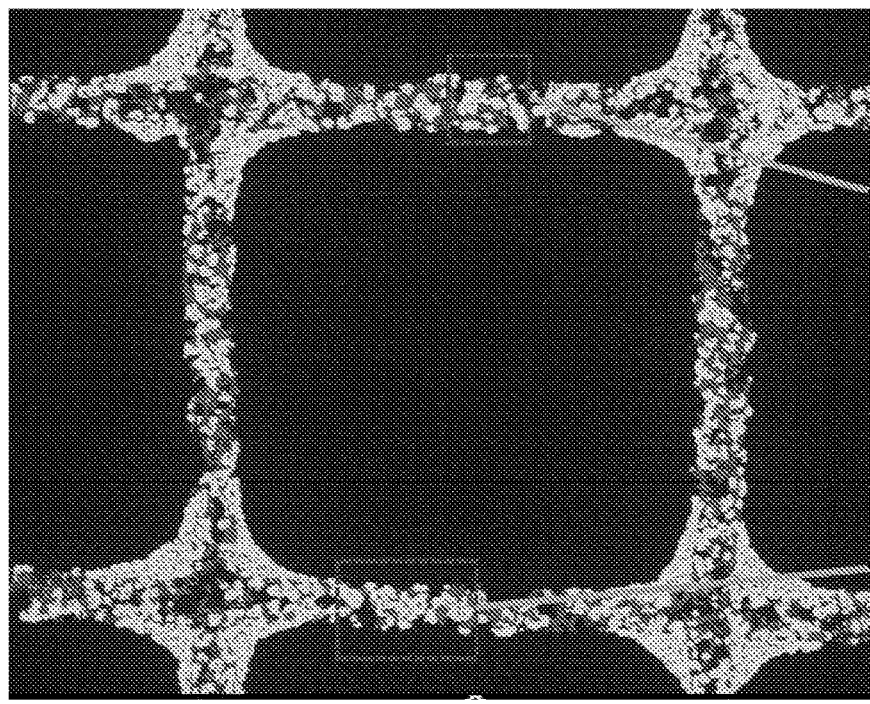
FIG. 3A schematically illustrates a cross-sectioned microstructural photograph of a composite structure showing a subsection with a porous glass or ceramic-containing phase that comprises an internal interconnected porosity and a continuous, three-dimensional, interconnected, sintered metal phase at least located within the internal interconnected porosity according to one or more embodiments of the disclosure.
Figure 3B:
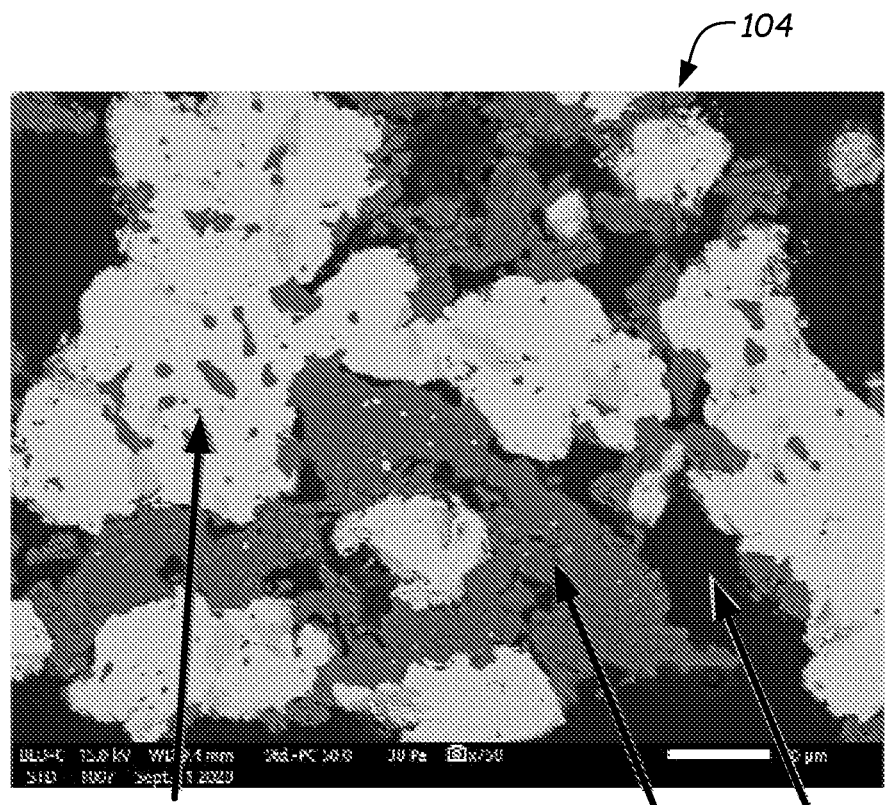
FIG. 3B schematically illustrates an enlarged, cross-sectioned, microstructural photograph of a wall segment of a composite structure showing the internal interconnected porosity and a continuous, three-dimensional, interconnected, sintered metal phase located at least within the internal interconnected porosity according to one or more embodiments of the disclosure.
Figure 3C:
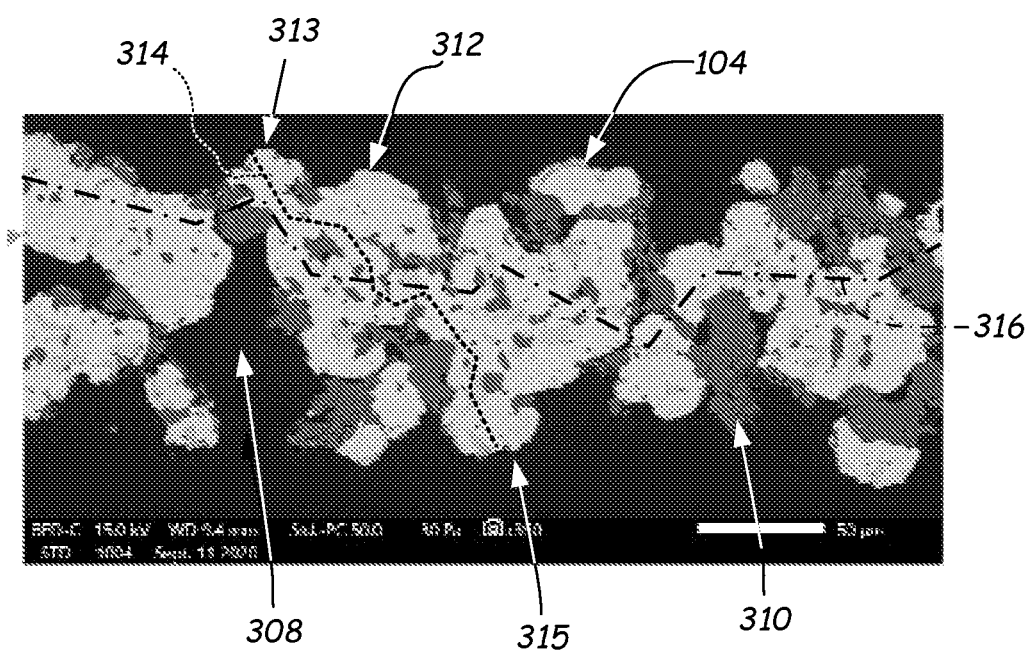
FIG. 3C schematically illustrates an enlarged, cross-sectioned microstructural photograph of a wall segment of a composite structure showing the internal interconnected porosity and continuous, three-dimensional, interconnected, sintered metal phase and further illustrating conductive paths within the wall segment according to one or more embodiments of the disclosure.

As noted above, composite structure 100 further comprises a continuous, three-dimensional, interconnected, electrically conductive phase, which may be referred to herein as the second phase (again, see for example the light grey areas designated with reference numeral 312 in FIGS. 3A-3C) that is located at least within and/or at least partially filling the internal interconnected porosity of the first phase (of glass or ceramic-containing material) of the porous walls 104. In some embodiments, the continuous, three-dimensional, interconnected, electrically conductive (second) phase 312 comprises a metal, such as a sintered metal. The continuous, three-dimensional, interconnected, electrically conductive phase 312 is formed from a different material than that of the first phase described above. The metal can be an electrically conductive metal. For example, the electrically conductive metal can be a Fe-containing alloy, an Fe—Cr alloy, an Fe—Al alloy, an Fe—Ni alloy, or a W—Co alloy, for example.

In some embodiments, an iron-chromium alloy such as an Fe, Cr, and Al containing alloy, (e.g., a FeCrAl alloy) is used for the second phase of the composite structure 100. Alternatively, in some embodiments, the electrically conductive metal is a nickel-chromium containing alloy, such as an austenitic nickel-chromium containing alloy. An example of an austenitic nickel-chromium containing alloy is commercially available from Specialty Materials Corporation under the name INCONEL, which can be about 50% to 58% nickel by weight and 17% to 23% chromium by weight, based on the total metal weight. Fe—Cr—Al, Fe—Cr, and Fe—Al alloys may be particularly useful in some embodiments due to their low cost and/or high resistance to heat, oxidation, and corrosion.

Other suitable electrically conductive, oxidation resistant, high melting point metals can be used. In some embodiments, the metal-containing material exhibits a melting point of greater than 1,200° C., greater than 1,300° C., or even greater than 1,400° C. For example, these melting points are above catalyst light-off temperatures (and thus, suitably for use in a resistance heater assembly, as described herein), and also enables the metal material to withstand engine exhaust temperatures, as well as sintering temperatures in embodiments in which the second phase 312 is formed by a metal sintering process as described herein. In some embodiments, the metal-containing material of the second phase exhibits electrical resistivity of less than $1.2 \times 10^{-6}$ Ohm-m, less than $1.1 \times 10^{-6}$ Ohm-m, or even less than $1.0 \times 10^{-6}$ Ohm-m. Resistivity, as referred to herein, can be measured by ASTM B193-20 entitled "Standard Test Method for Resistivity of Electrical Conductor Materials."

Other suitable materials for the electrically conductive phase 312 include silicon carbide (SiC), such as for use with element temperatures of 1,300° C. to 1,500° C. and peak power density of 50 watts per square inch, and molybdenum disilicide ($MoSi_2$), such as for use with operating temperatures of 1,300° C. to 1,500° C. and peak power densities of up to almost 200 watts per square inch. Other suitable electrically conductive materials for forming the electrically conductive phase 312 can comprise $SnO_2$ and $ZrO_2$.

If the electrically conductive material of the second phase 312 is a metal, it can be a fully sintered metal, such as manufacturing processes in which the honeycomb body 102 is sintered after first being subjected to (immersed in) a metal-containing slurry containing metal particles. The sintering temperature can be above about 1,200° C., for example, depending on the material being sintered. For example, sintering can often be achieved by heating to within 60%-80% of the melting point for many metals for a sufficient time to reform the metal particles for the purposes of achieving joining (interconnection) of the particles. In this way, sintering can be utilized to provide a continuous connected structure for the second phase. Additionally, sintering may assist in increasing electrical conductivity by improving connectivity of the electrically conductive phase, as well as provide better oxidation resistance by reducing the surface area once the particles are sintered together, for example.

In other embodiments, the composite structure 100 comprises a sufficiently high weight percentage of electrically conductive particles disposed within the internal interconnected porosity 308 of the first phase 310 of the composite material of the porous walls 104 to form the continuous, three-dimensional, interconnected, electrically conductive (second) phase 312. By sufficiently high weight percentage it is meant that the conductive particles in these embodiments are provided in a volume percentage that results in the conductive particles being sufficient packed together or otherwise in intimate contact with one another within the internal porosity in order to form the continuous, three-dimensional, interconnected, electrically conductive phase 312, which imparts a desired conductivity for the composite material as a whole.

In some embodiments, a desired level of electrical conductivity of the composite structure 100 is achieved by loading the electrically conductive phase 312 in the internal, interconnected porosity 308 of the first phase 310 at a weight loading level of at least 200 g/L with respect to a representative volume of the composite structure (described in more detail below), at least 400 g/L of the representative volume, at least 800 g/L of the representative volume, or even at least 1,200 g/L of the representative volume of the composite structure. In some embodiments, the three-dimensional, interconnected, electrically conductive phase 312 is present in the internal, interconnected porosity 308 at a loading level of greater than 200 g/L and less than 8,000 g/L with respect to a representative volume of the composite structure, for example. In further embodiments, loading levels of greater than 200 g/L of representative volume and less than 6,000 g/L of the representative volume are desired. Additional electrically conductive material, which is not included in the stated weight loadings, can be loaded onto the exterior surfaces of the first phase.

In some embodiments, the electrically conductive phase 312 in the internal, interconnected porosity 308 of the first phase 310 at a volume loading level of at least 25 $cm^3$/L with respect to the representative volume of the composite structure, at least at least 50 $cm^3$/L of the representative volume, at least 100 $cm^3$/L of the representative volume, or even at least 150 $cm^3$/L of the representative volume of the composite structure. In some embodiments, the three-dimensional, interconnected, electrically conductive phase 312 is present in the internal, interconnected porosity 308 at a loading level of greater than 5 $cm^3$/L and less than 1000 $cm^3$/L with respect to a representative volume of the composite structure, for example. In further embodiments, loading levels of greater than 25 $cm^3$/L of the representative volume and less than 750 $cm^3$/L of the representative volume are desired. Additional electrically conductive material, which is not included in the stated volume loadings, can be loaded onto the exterior surfaces of the first phase.

The expressed measure of grams (g) per liter (L) in the embodiments disclosed herein is determined with respect to a representative volume of the composite structure, where the representative volume as referred to herein is defined as a closed frontal area of the body 102, (or a representative portion thereof), multiplied by an axial length of the composite structure 100. For example, a representative portion of the composite structure having a volume of one liter can be evaluated. The representative portion can be taken from the center of the honeycomb body 102, for example. The closed frontal area includes the projected frontal area of a base structure of the body 102 corresponding to the first phase (e.g., before loading with the second phase or excluding any loading of the second phase on the exterior surfaces of the first phase). Since the representative volume is determined from the closed frontal area (projected frontal area), the representative volume of the composite structure is accordingly made up of the volume of the solid glass or ceramic-containing phase 310, as well as the internal porosity of the first phase. For example, the representative volume can be calculated as the closed frontal area of the walls 104, excluding any of the second phase located on the exterior surfaces of the first phase. Alternatively, for example, if the first phase 310 is formed from a porous ceramic honeycomb base structure (as described herein), the representative volume of the composite structure can be determined by multiplying the closed frontal area by the axial length of the base structure from which the first phase is formed. Thus, the volume of the channels 106 are not included in the representative volume of the composite structure 100. Moreover, the representative volume as referred to herein excludes the skin 111 of the body 102, as well as any partial cells present at the periphery adjacent to the skin 111.

When the continuous, three-dimensional, interconnected, electrically conductive phase 312 is provided within the interconnected porosity of the first phase 310 and extends between opposite surfaces of the walls 104, this provides a plurality of electrical connections or current-carrying paths through the wall 104. For example, these electrical connections can be formed by various branches, fingers, or other elongated portions of the second phase 312 that frequently bend, twist, turn, split, recombine, narrow, and/or widen as the conductive phase 312 is formed as the aforementioned three-dimensional network through the tortuous flow paths of the porosity of the first phase 310.

FIG. 3C, for example, illustrates an electrical connection or current carrying path 314 passing through the wall 104, between opposite surfaces 313 and 315 of the wall 104. Since the second phase 312 creates a three dimensional structure, many more connections are present through the wall 104, but cannot be seen in the cross-sectional view of FIG. 3C, as in some cases the second phase 312, and therefore the corresponding current-carrying path, traverses in a direction perpendicular to the plane in which the cross-section was taken.

Furthermore, in some embodiments, the continuous, three-dimensional, interconnected, electrically conductive (second) phase 312 also provides a continuous, electrically conductive connection (current-carrying path) in a direction that extends along the walls 104, such as within the interior of the walls 104. For example, as shown in FIG. 3C, dotted and dashed path 316 illustrates a continuous, electrically conductive connection provided along an interior of the walls 104. In some embodiments, the second phase 312 is also located on the exterior surfaces of the walls 104, thereby forming at least portions of the exterior surfaces of the walls (such as the surfaces 313 and 315), to also carry current along the exterior surfaces of the walls 104. For example, as shown in FIG. 3A, a comparatively heavy concentration of the conductive material of the second phase 312 can be present at the intersections of the walls 104, which may be advantageous to promote electrical connection between multiple different walls, for example, between walls 104 that extend in two or more different directions.

When used as part of a heater apparatus 101, the amount of loading of the first phase 310 with the electrically conductive phase 312 to form the composite material of the composite structure 100 can be selected or determined so that it is sufficient to impart a desired or targeted electrical conductivity, e.g., suitable for the composite structure 100 to operate as a resistance heater when connected to a power source. In some embodiments, particularly those resembling that of FIGS. 1A-1B in which the body 102 is formed by a continuous array of intersecting walls 104 (i.e., having no cutout portions 107), the electrical conductivity of the composite structure 100 as a whole is less than or equal to 300 S/cm, less than or equal to 200 S/cm, less than or equal to 150 S/cm, or even less than or equal to 100 S/cm. In some embodiments, the electrical conductivity can be greater than or equal to 15 S/cm. In some embodiments, the electrical conductivity can be any range including the aforementioned values as end points, such from 15 S/cm to 300 S/cm, or from 15 S/cm to 150 S/cm.

In other embodiments, such as the embodiments shown in FIGS. 1C and 1D that contain cutout portions 107, the electrical conductivity per unit length along the conductive path can be higher than non-serpentine bodies (embodiments that do not contain cutout portions 107). For example, in these serpentine heaters, depending on the total length of current carrying path, the electrical conductivity can be at least 300 S/cm, at least 500 S/cm, at least 1,000 S/cm, or even at least 1,500 S/cm. In some embodiments of serpentine heaters (including the cutout portions 107), the electrical conductivity can at most 2,500 S/cm, or any range including the aforementioned values as endpoints, such as from 1,000 S/cm to 2,500 S/cm. In some embodiments, it may be desirable for a serpentine body of a resistance heater to have electrical conductivity to be between 300 S/cm and 1,000 S/cm.

Figure 9:
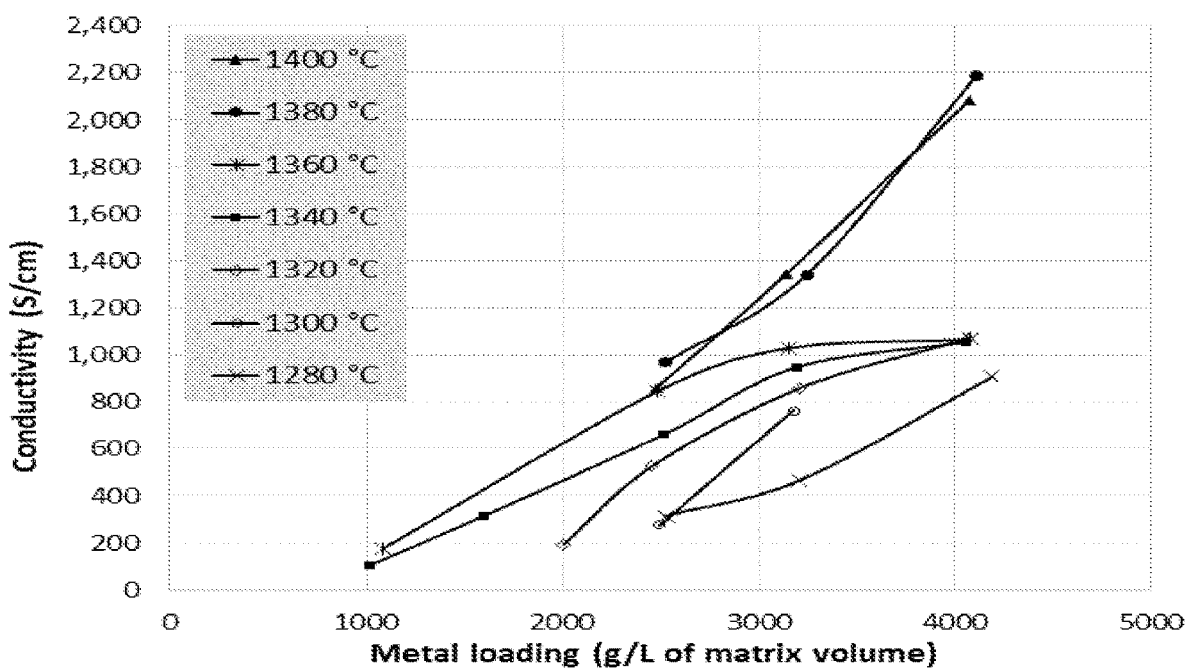
FIG. 9 illustrates a plot of conductivity (S/cm) versus metal phase loading (g/L of representative volume) of the composite structure at various sintering temperatures according to one or more embodiments of the disclosure.

In the case that the electrically-conductive phase 312 is manufactured by sintering electrically conductive particles, the particle-loaded part can be fired at different temperatures, e.g., ranging from 1,250° C. to 1,400° C. for many of the metal-containing materials described herein for the conductive phase 312, to achieve different levels of sintering, which in turn leads to different values of electrical conductivity FIG. 9 shows the relationship between metal loading and conductivity for various sintering (firing) temperatures. Such firing operates to change point contacts between individual particles into a continuous single electrically conductive phase. As illustrated by FIG. 9, the degree of firing (temperature and time) can influence the electrical conductivity, with the electrical conductivity generally increasing with increasing degrees of sintering. Accordingly, the firing conditions for sintering the conductive particles into the continuous conductive phase 312 provides a useful mechanism that can be used to adjust and control overall electrical conductivity of the composite structures described herein.

In embodiments in which the continuous, three-dimensional, interconnected, electrically conductive phase is manufactured from electrically conductive metal particles infiltrating the internal interconnected porosity of a base matrix or structure (the first phase 310), the metal particles should be small enough to be received within the interconnected open porosity. For example, in some embodiments, the first phase 310 has an average bulk porosity of greater or equal to 40%, and a median pore size of greater than or equal to 5 μm. Other levels of average bulk porosity can be used, such as average bulk porosity from about 40% to about 80%. In some embodiments, the median pore size of the internal, interconnected porosity of the first phase 310 is selected depending on the size of the conductive particles utilized to form the second phase 312. For example, if the conductive particles are very fine, then the pores can be made smaller and the particles will still infiltrate the pores. If the conductive particles are larger, the pore size should also be made relatively larger. In some embodiments, the median pore size of the internal, interconnected porosity of the first phase 310 is at least two times, at least three times, at least four times, or even at least five times larger than the median particle size of the conductive particles, such as from two to twenty times larger. For example, a median pore size of about 5 μm could be appropriate for a median particle size of about 0.5 μm to 2 μm, while a median pore size of about 40 μm could be appropriate for a median particle size of about 5 μm to 10 μm, although other sizes and ranges can be used in other embodiments.

Another desired property of the internal, interconnected porosity of the first phase 310 is that it can include a pore size distribution (Db), which may be referred to as a breadth of the pore size distribution, that satisfies Db≤1.0, or even Db≤0.75, wherein Db is defined as: Db=d50/(d90−d10); and d50 is the median pore size; d90 is the size larger than the smallest 90% of the pores in the distribution; and d10 is the size larger than the smallest 10% of pores in the distribution.

In some embodiments, the electrically-conductive particles utilized in the creation of the conductive phase 312 have a median particle size of less than or equal to 25 μm, a median particle size that ranges from 0.5 μm to 25 μm for example, or even from 1 μm to 15 μm in some embodiments. In some embodiments, e.g., in order to facilitate infiltration of the porosity of the first phase, the electrically-conductive particles have a particle size distribution (Dpb), wherein Dpb may be referred to as a breadth of the particle size distribution, that is narrow, such as where Dpb≤1.25, or even Dpb≤1.0, wherein Dpb is defined as: Dpb=dp50/(dp90−dp10); and where d50 is the median particle size; d90 is the size larger than the smallest 90% of the particles in the distribution; and d10 is the size larger than the smallest 10% of particles in the distribution.

Narrow particle size distribution of Dpb≤1.25 is advantageous in some embodiments to maximize overall in-wall deposition by reducing the presence of oversized particles that cannot readily penetrate into the pore structure, thus reducing large particles being deposited on the surface of the wall 104. The narrow particle size distribution may also minimize the presence of very small particles that may pass through the porosity of the first phase 310 as opposed to being caught at locations within the tortuous paths formed by the porosity.

In some embodiments, the composite structure 100 comprises the continuous, three-dimensional, interconnected, electrically conductive second phase 312 in a volume greater than or equal to about 10% of the total solid volume of the composite structure 100. The total solid volume of the composite structure 100 is the volume of the solid portion of first phase 310 of the composite structure 100 plus the volume of the three-dimensional, interconnected, electrically conductive phase 312 disposed in or on the first phase, thus excluding any remaining unfilled porosity (in contrast to the representative volume, described above, which includes the remaining unfilled porosity). In some embodiments, the composite structure 100 comprises the continuous, three-dimensional, interconnected, electrically conductive second phase 312 in an amount from about 10% to about 75% of the solid volume of the composite structure 100. In some embodiments, the composite structure 100 the first phase 310 (solid glass or ceramic-containing portions of the walls 104) in an amount from about 25% to 90% of the total solid volume of the composite structure 100.

In some embodiments, the continuous, three-dimensional, interconnected, electrically conductive phase 312 incompletely fills the internal, interconnected porosity of the first phase 310 and leaves residual bulk porosity (black areas within the walls 104 in FIGS. 3A-3C, designated with reference numeral 308). The residual open porosity is porosity that can be used for the anchoring of, or addition of, a catalyst material to the composite structure 100, if desired. However, in a high loading case, a large percentage of the porosity may be filled with the three-dimensional, interconnected, electrically conductive phase 312, thus leaving little volume for additional material in the porosity. In some embodiments, even those in which the walls 104 have little remaining open porosity, catalyst material can be added on the surfaces of the walls 104.

In any event, the catalyst material can be disposed in the residual open porosity of the porous walls 104 and/or on the surfaces of the porous walls 104 and thus can form a catalyzed substrate, e.g., useful in the manufacture of a catalytic converter, electrically heated catalyst assembly, or other exhaust aftertreatment system, assembly, or component. A catalyst material i can be applied in any suitable manner, such as washcoating. A washcoat can include, for example, a particulate oxide material, such as an alumina slurry or other suitable oxide-containing slurry and one or more catalyst metal materials. The catalyst material can be applied to at least the walls 104 of the body 102 by any conventional method.

The catalyst material can comprise one or more metal materials that operate to reduce a concentration of an exhaust pollutant in a flow of an exhaust gas, for example. For example, catalyst materials include platinum group metals, such as platinum, palladium, and/or rhodium. The catalyst material can comprise gold, silver, copper, or iron in some embodiments. For example, the catalyst material washcoat can provide a three-way catalyst enabling conversion of oxides of nitrogen ($NO_x$), oxidation of CO (carbon monoxide) to less-harmful $CO_2$ (carbon dioxide), and oxidation of HC (unburned hydrocarbons) to $CO_2$ (carbon dioxide) and $H_2O$ (water).

In such three-way catalyst designs, exhaust gases are directed to flow through the composite body 100 containing the catalyst material, which allows the catalysis reaction to occur, provided sufficient temperatures are present (e.g., mid-bed temperatures of about 250° C. or more). A catalyst washcoat may have a both a conductive metal portion (e.g., particles of a platinum group metal) and a nonconductive portion (e.g., alumina particles). For example, in some embodiments the catalyst metal material (conductive portion of the washcoat) can be applied to the composite structure 100 at a weight loading level per representative unit volume of the composite structure 100 of less than 40 g/L or even less than 20 g/L. Because the loading level is low compared to the volume of the conductive phase 312, it will not significantly change the electrical conductivity of the composite structure 100, i.e., the conductive particles in a washcoat will not create an electrically conductive path as the catalyst particles are isolated, irregularly deposited, separated, and/or otherwise discontinuous within the catalyst-containing washcoat.

For example, a three-way catalyst (TWC) may include catalyst metal material made of one or more platinum group metals (PGM) such as platinum, palladium, and rhodium, provided within a washcoat oxide blend material of alumina and/or ceria-zirconia. Likewise, a SCR catalyst material may comprise Cu and/or Fe as the catalyst metal material in a washcoat including zeolite as the oxide component. Other types of catalyst metal materials can be applied in a similar manner to the composite body 100, such as a diesel oxidation catalyst.

Figure 4:
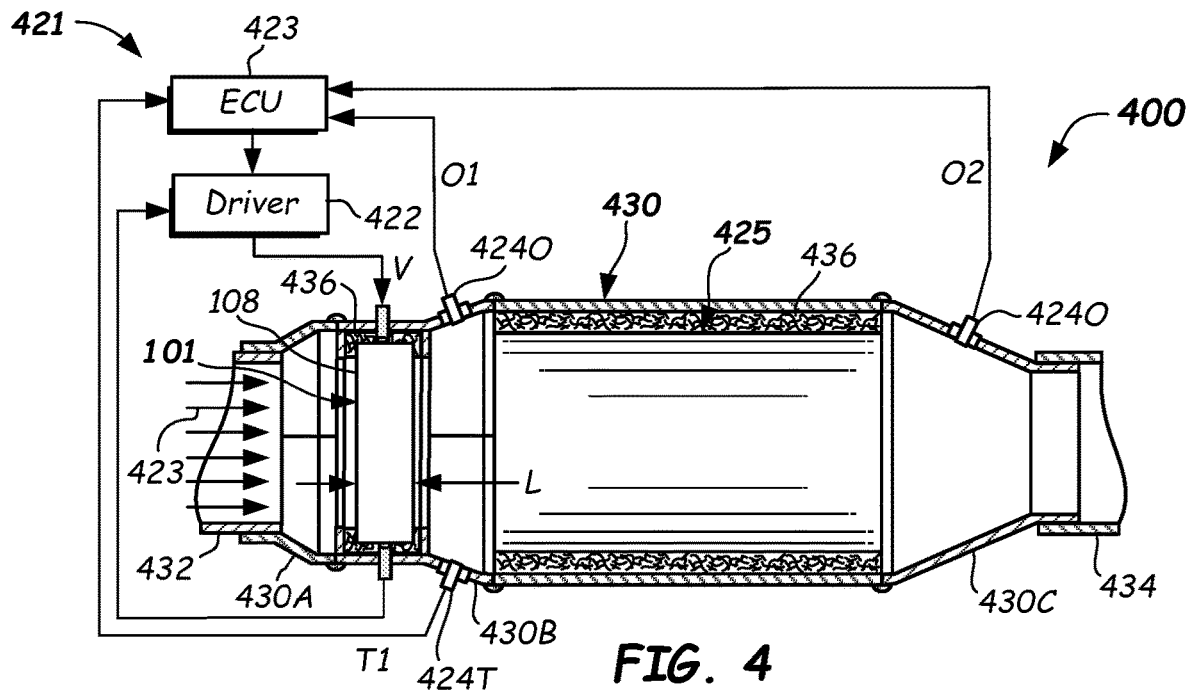
FIG. 4 schematically illustrates a cross-sectional side view of an exhaust aftertreatment system including a catalyst substrate and a composite structure that is embodied as part of a heater apparatus according to one or more embodiments of the disclosure.

As shown in FIG. 4, electrical potential can be applied to the body 102 by a control system 421 using a voltage driver 422 (e.g., connected to the body 102 via the electrodes 117 and electrical leads 119, as shown in FIGS. 1A-1D). Thus, the composite structure 100 can be implemented as part of a heater apparatus 101, such as a resistive heater that is part of an exhaust aftertreatment system 400 and can be positioned adjacent (e.g., upstream or downstream of) a catalyzed substrate 425. In some embodiments, multiple heaters and/or multiple catalyzed substrates can be included in the system 400.

Still referring to the exhaust aftertreatment system 400 shown in FIG. 4, the catalyzed substrate 425 can be of the flow-through type (e.g., having a porous ceramic honeycomb structure, generally corresponding to the first phase 310 as described above, in which gas flows directly through channels akin to the channels 106), and the heater apparatus 101 (e.g., any embodiment disclosed herein, including as described with respect to FIGS. 1A-1D) positioned adjacent to the catalyzed substrate 425. As described above, the heater apparatus 101 comprises the composite structure 100 having the body 102 comprising a matrix or array of intersecting walls 104. The composite material of the walls 104 comprises a first phase of glass or ceramic-containing material (the first phase 310) and a second phase of an electrically-conductive material (the second phase 312) forming a continuous, three-dimensional, interconnected, electrically conductive path (e.g., the path 314) within at least within the porosity of the first phase 312 and extending through the walls 104 between opposite surfaces of the walls 104. The electrically-conductive material can also be disposed on the walls 104.

The exhaust aftertreatment system 400 further comprises a control system 421 coupled to the heater apparatus 101 and possibly to one or more components of the catalyzed substrate 425. The control system 421 is configured to drive power to the heater apparatus 101 at appropriate times. Power may be driven at various times during or before operation of the engine coupled to the exhaust aftertreatment system 400.

The timing, duration, and/or magnitude of the applied potential (e.g., voltage) can be controlled by the control system 421. Control system 421 can generate suitable drive signals to a driver 422 (e.g., voltage driver) as provided by an engine control unit (ECU) 423 in order to provide a desired thermal profile to the heater apparatus 101 and thus to the catalyzed substrate 425. The thermal profile can be any suitable thermal profile that is desired to reduce cold-start emissions, for example. In some embodiments, the thermal profile imparted within the catalyzed substrate 425 can have a goal of achieving a threshold temperature (e.g., 250° C. to 650° C., depending on the catalysis system used) within a few seconds after startup of the engine, e.g., within 2 to 10 seconds.

The target temperature of the heater apparatus 101 can be determined as a function of the flow rate of the exhaust gas, temperature of the gas flow at the inlet of the body, heat transfer coefficient between the body and the gas flow, and applied power based on a goal or desired outcome. For example, one goal may be to achieve fast heat up and thus fast light-off of the catalyzed substrate 425 to initiate emission conversion quickly (e.g., within a few seconds) after engine startup (ignition). The specific goals of heat up may be different among different usage applications, but as an example it may be desirable to achieve a mid-bed (e.g., center of the catalyst substrate 425) temperature of 250° C.-450° C. in less than 20 seconds, less than 15 seconds, or even less than 10 seconds in some embodiments. Mid-bed temperature can be directly measured at a mid-bed location, or estimated based on one or more temperature measurements taken upstream and/or downstream from the catalyzed honeycomb 425. For example, temperature measurements T1 from temperature sensor 424T can be correlated, via experiments, with mid-bed temperature at the physical middle of the catalyzed substrate 425. Other suitable measurements can be used. Additionally, the temperature sensor 424T can be installed in other locations, and/or multiple temperature sensors installed to better monitor the temperature of the gas flow as it moves through the system 400.

In each of the above examples, the time to 50% conversion efficiency can also be impacted by starting the heater apparatus 101 before ignition (starting) of the engine. For example, if power is delivered to the heater apparatus 101 for about 5 seconds before ignition of the engine (e.g., which may be referred to as "preheating"), the light-off time might drop even further. In this preheating instance, light-off time may be reduced to less than 8 seconds, or even less than 6 seconds, or less from engine start.

The thermal profile can start at initiation of ignition of the engine, or even sooner. Auxiliary inputs to the control system 421 can be used, such as one or more oxygen readings (e.g., oxygen readings O1 and/or O2 from oxygen sensors 424O) and/or temperature readings from one or more temperature sensors 424T. Any suitable algorithm can be implemented by the control system 421 to control the thermal profile of the heater apparatus 101 comprising the composite structure 100 or the composite structure 100 combined with a catalyst material (e.g., three-way or other catalyst). In some embodiments, one goal of the exhaust heater 101 in the exhaust aftertreatment system 400 is to operate to effectively heat the inflow of exhaust gas 423 so that it is sufficiently hot enough to undergo a catalysis reaction within the downstream positioned catalyst substrate 425.

Thus, in the embodiment of FIG. 4, the exhaust aftertreatment system 400 is provided that comprises the composite body 100 configured as part of the heater apparatus 101. The continuous, three-dimensional, interconnected, electrically conductive phase 312 can comprise an electrically conductive material, such as an electrically-conductive metal (e.g., a fully or partially sintered metal). Thus, the continuous, three-dimensional, interconnected, electrically conductive phase 312 provides an electrical path through the walls 104, which enables current to be carried laterally (in a direction perpendicular to the axial direction) across the body 102, such as between the first side 113 and the second side 115 of the body 102.

Similar to the composite body 100 discussed above, the exhaust heater 101 can optionally include a catalyst material (e.g., platinum, palladium, rhodium, or combinations thereof). The catalyst material can be supported on a high surface area washcoat material, such as gamma alumina. Washcoat may also include an oxygen storage component (e.g., ceria-zirconia, or the like) that is disposed on the walls 104, or at least partially within the remaining unfilled open porosity of the walls 104.

The outer shape of the exhaust heater 101, as shown, can comprise a rectangular parallelepiped (cuboid or rectangular prism) outer perimeter shape as is shown in FIG. 1A. However, other outer perimeter shapes may be used, such as a cylindrical shape, oval prism shape, a triangular or tri-lobed prism shape, a hexagonal prism shape, an elliptical prism shape, a trapezoidal prism shape, or any other polygonal prism shape or combination thereof, including polygonal shapes with rounded corners.

The exhaust heater 101 having a rectangular (e.g., square) outer perimeter profile when viewed from the inlet side 108 can be readily integrated into the exhaust aftertreatment system 400 by including shape transition zones, e.g., zones 430A, 430B, 430C in FIG. 4, that traverse from a round shape where the can 430 interfaces with and connects to an inlet pipe 432 and outlet pipe 434 (only portions thereof being shown). The exhaust heater 101 and catalyzed substrate 425 can be as closely coupled to the engine as is practical.

As should be understood, if the exhaust heater 101 has a rectangular (e.g., square) outer perimeter profile and the catalyzed substrate 425 has a cylindrical outer profile, then the pipe can go from round to rectangular in transition zone 430A, and from rectangular to round at transition zone 430B, and from a larger round shape to a smaller round shape in transition zone 430C comprising a frustocone. However, the piping and transition zones illustrated in FIG. 4 are for purposes of discussion only, and any other combination of shapes, sizes, and dimensions can be utilized.

Any suitable canning technology may be used for assembly of the exhaust aftertreatment system 400, such as clamshell, laterally welded, and the like. The heater apparatus 101 can be fairly thin (axially short) relative to the axial length of a catalyst substrate of filter (e.g., about 0.2 inch (5 mm) to about 2.0 inch (51 mm) in axial length L, as illustrated in FIG. 4). Further, insulators 118 (see FIGS. 1A-1B) can be used in some embodiments to facilitate the passage of electrical components, e.g., the electrodes 117 and/or the leads 119, through the can 430, e.g., to prevent an electrical short.

In some embodiments, additional insulation 436 can be included about and/or abutting the heater assembly 101, to help support the heater during operation, e.g., thereby reducing the possibility of an electrical short circuit during exposure to vibration, thermal cyclings, or environmental conditions. For example, any suitable cushioning or mat materials, such as those conventionally used for supporting porous ceramic honeycomb bodies (e.g., catalyst substrates or particulate filters) can be used for the insulation 436 to support the composite structure 100 of the exhaust heater 101 and/or the catalyzed substrate 425. In some embodiments, the insulation 436 can wrap around the outer periphery and/or the axial ends (inlet and outlet faces) of the heater apparatus 101 as shown in FIG. 4 to provide the aforementioned cushioning and electrical short prevention in the radial and/or axial directions.

In some embodiments, the composite structure 100 is used as a structural component, which is not electrified (i.e., is not part of a heater assembly). The metal phase 310 can be a high yield strength, corrosion resistant material. For example, aluminum, stainless steel, titanium, nickel, or like metal materials or alloys thereof can be used. Materials, such as metals having a tensile strength of greater than 90 MPa in tension are desired in some embodiments for such structural applications.

Such composite structures 100 can exhibit excellent compression strength as well as strength-to-weight ratios, and can be used for structural components, including, for example, subcomponents of larger structures. For example, the composite structures 100 can have a compression strength of greater than 50 MPa in compression, for example. Further, the composite structures 100 can have a compressive strength, measured on a 1.0 inch×1.0 inch×1.0 inch cube of the composite structure 100 loaded in compression along the axial direction (along the direction of the channels 106), of 1.5 times or higher as compared to a honeycomb structure made from only the glass or ceramic-containing phase (first phase) with no metal loading.

Figure 6:
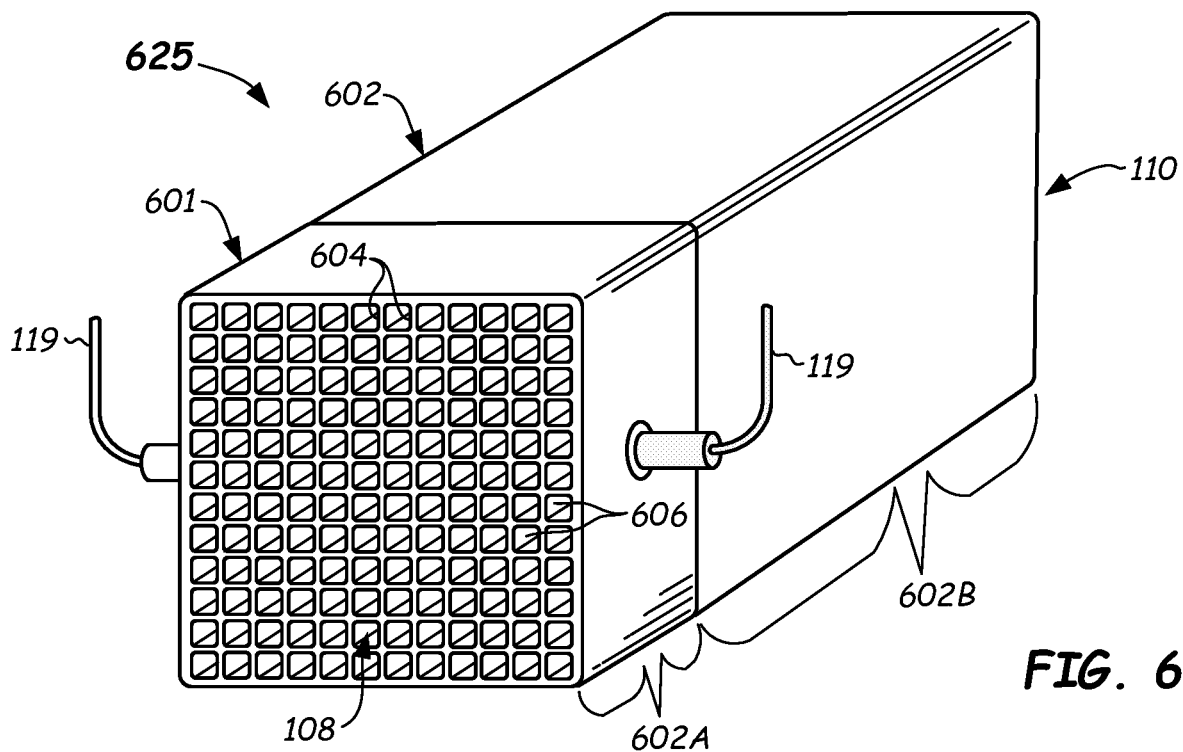
FIG. 6 schematically illustrates a perspective view of a catalyst-containing substrate including an integral composite structure, embodied as part of a heater apparatus and including an electrically conductive phase that is provided at a front portion thereof according to one or more embodiments of the disclosure.

In some embodiments, only a portion, such as only one axial end, of the structure of the first phase 310 is infiltrated with conductive particles, which are sintered to form the conductive second phase 312. Accordingly, in some embodiments a composite structure is formed in which a first axial length comprises the composite material as described herein with respect to the composite structure 100 and in which a second axial length comprises only the glass or ceramic-containing material of the first phase 310 (or the first phase 310 in combination with a material other than the conductive phase 312). For example, FIG. 6 schematically illustrates an embodiment of a catalyzed substrate 625 including a first end portion 602A (e.g., upstream in use) of the body 602 comprising a heater 601 manufactured with a composite structure 600 essentially identical to the composite structure 100 described herein. A second end portion 602B (e.g., downstream in use) of the catalyzed substrate 625 comprises a porous honeycomb body that includes porous walls 604 catalyzed with a catalyst-containing washcoat, such as a three-way catalyst or other suitable catalyst material. The catalyst can be applied as part of a catalyst-containing washcoat that is disposed on the porous walls 604 using conventional methods.

Similar to the bodies 102 described above, the body 602 comprises a honeycomb structure comprising intersecting porous walls 604 forming a plurality of axially-extending channels 606 that extend from the inlet end face 108 to the outlet end face 110. The structure and materials of the first end portion 602A can be identical to the embodiment shown in FIGS. 1A-1B, however, the second end portion 602B does not include the electrically conductive material of the second phase 312. Instead, the second end portion 602B includes a porous ceramic material, e.g., as described with respect to the first phase 310, and the catalyst material disposed in or on the porous ceramic material. The first end portion 602A can comprise the catalyst material in addition to the composite material formed from the combination of the first phase 310 and the electrically conductive material of the second phase 312. For example, the first end portion 602A can be formed by loading the electrically conductive material into the interconnected porosity of the first phase without loading the second end portion 602B, and then sintering the body 602 to create the second phase 312 in the first end portion 602A only. Electrical leads 119 can be connected to a control system (such as control system 421) in the manner shown in and described with respect to FIG. 4.

Figure 5A:
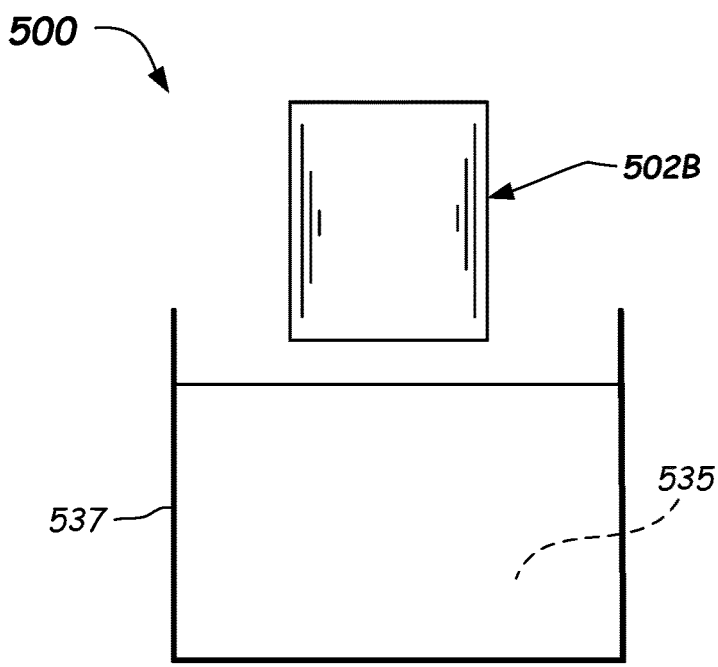
FIGS. 5A and 5B schematically illustrate cross-sectional side views of a processing apparatus configured to subject a honeycomb body to a slurry containing electrically conductive particles according to one or more embodiments of the disclosure.
Figure 5B:
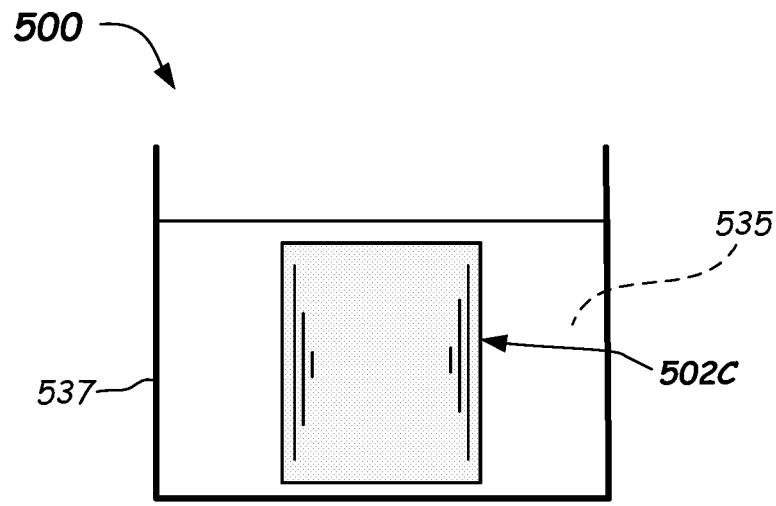

FIGS. 5A and 5B schematically illustrate schematic side views of a coating apparatus 500 operatively used to subject an uncoated based structure 502B of the first phase 310, to a slurry 535 containing the electrically conductive material that ultimately forms the second phase 312. As described herein, submersing the uncoated base structure 502B in the slurry 535 enables the internal porosity of the first phase 310 to be at least partially filled with conductive particles in order to form the second phase 312, such as by heavily loading the porosity of the first phase 310 with the conductive particles and/or by sintering the conductive particles.

Figure 7:
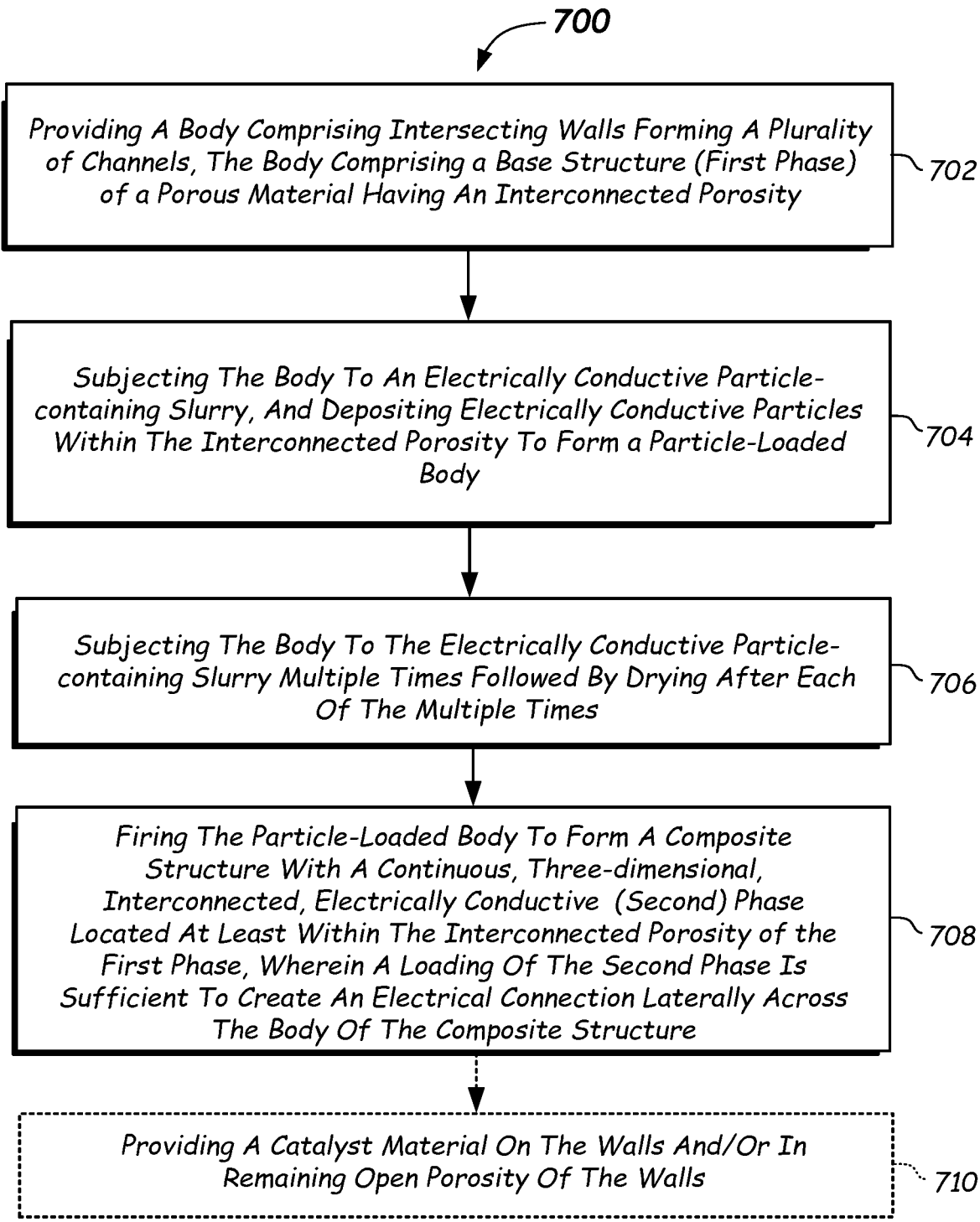
FIG. 7 illustrates a flowchart of a method of manufacturing a composite structure according to one or more embodiments of the disclosure.

A method 700 of manufacturing the composite structure 100 is further described with reference to FIG. 7. The method 700 comprises, in block 702, providing an uncoated base structure (e.g., a base structure 502B) comprising intersecting porous walls (e.g., porous ceramic walls, embodied by the first phase 310) containing interconnected porosity (e.g., porosity 308). For example, the base structure (e.g., which ultimately forms the first phase 310 of the composite structure) can be in the form of a porous ceramic honeycomb body. The intersecting porous walls comprise an internal, interconnected porosity. The base structure can have a macrostructure comprising a cell density of from 200 cpsi to 900 cpsi, such as from 200 cpsi to 600 cpsi, in some embodiments. Average bulk porosity (% P) and median pore size can be provided as is described herein. Any suitable porous glass, glass-ceramic, or ceramic material as described herein can be used for the base structure 502B that ultimately forms the first phase 310. Suitable sizes for the base structure 502B for the heater apparatus 101 depend on the intended application, such as the engine size, engine type, engine exhaust temperature, engine exhaust flow rate, etc., but can have an axial length L (e.g., see FIG. 4) of, e.g., 2 mm to 51 mm, a width W (see, FIG. 1B) from side 113 to side 115 of 51 mm to 400 mm, and a height H from side of 51 mm to 400 mm, for example. Other suitable sizes may be used, such as for induction heating applications, or when the composite body 101 is used in structural support applications.

The method 700 further comprises, in block 704, subjecting the plurality of channels (e.g., channels 106) to an electrically conductive particle-containing slurry (e.g., the slurry 535), wherein the electrically conductive particle-containing slurry is drawn into and deposits conductive particles at least within the interconnected porosity (e.g., porosity 308) of the porous walls of the base structure, thus forming a particle-loaded body (see particle-loaded body 502C in FIG. 5B). Some of the electrically conductive particle-containing slurry 535 may also be deposited on the walls 104.

Subjecting the plurality of channels 106 to an electrically conductive particle-containing slurry 535 may be performed by any suitable method, such as dipping the base structure 502B in the electrically conductive particle-containing slurry 535, e.g., contained in a vessel 537 to form the particle-loaded body 502C. The electrically conductive particle-containing slurry can, in one embodiment, contain electrically conductive metal particles. The electrically conductive metal particles can have a median particle size of less than or equal to 25 µm, such as from 0.1 µm to 25 µm, or as otherwise described herein with respect to the conductive particles used to form the second phase 312. Other median particle sizes can be used. In general, the median particle size should be smaller than a median pore size of the porosity (e.g., the porosity 308) of the base structure 502B (which forms the first phase 310)

Following the subjecting in block 704, the particle-loaded body can be dried in block 706. Drying can involve placing the coated body 502C in a drying apparatus, such as a furnace or other conventional drying apparatus. Drying times and temperatures can vary based on the size and geometry of the particle-loaded body 502C, as well as the solvent or liquid carrier in the slurry 535 used to carry the conductive particles. For example, drying times and temperatures can vary from 80° C. to 200° C. and from 2 minutes to 600 minutes, in some embodiments. In some embodiments, the base structure can be subjected to the electrically conductive particle-containing slurry 535 multiple times, e.g., followed by drying after each of the multiple times (e.g., after each dipping or application sequence). Particle-loading and drying can continue until a desired loading (g/L) of the electrically conductive material is achieved within the porosity 308.

Following the subjecting in block 704, and subsequent to drying in block 706, the method 700 may comprise, in block 708, firing the particle-loaded body 502C to form the continuous, three-dimensional, interconnected, electrically conductive phase (e.g., continuous, three-dimensional, interconnected, electrically conductive phase 312). The firing temperature can be high enough to sinter and fuse the electrically conductive particles together, and thereby form the continuous, three-dimensional, interconnected, electrically conductive phase, such as a metal phase, in the composite structure. The desired weight loadings expressed herein for the continuous, three-dimensional, interconnected, electrically conductive phase 312 is based on the final, as-fired, body. In some embodiments, the particle-loaded body 502C is loaded sufficiently to achieve a final weight loading level of electrically conductive material within the internal porosity of the base structure of at least 200 g/L of the representative volume of the composite structure, such as from 200 g/L with respect to the representative volume to 8,000 g/L with respect to the representative volume of the composite structure, in some embodiments.

In some embodiments, the firing of the particle-loaded body 502C to sinter the electrically conductive particles can occur in any suitable furnace or kiln. Firing temperatures can range from 1,200° C. to 1,450° C., for example, if full sintering is desired. However, in other embodiments, the firing can be at a lower temperature, such as less than 1000° C., or even less than 700° C. (e.g., from 400° C. to 700° C.) to provide calcining of the particles, for example. The firing temperature is dependent on the electrically conductive material being used, and the extent of sintering desired. For example, as described with respect to FIG. 9, the extent of sintering, reflected by control of the firing temperature, can be used to alter the electrical resistance of the body 102.

FIG. 9 illustrates effects of firing temperature from 1,280° C. to 1,400° C. and metal loading (in g/L) of metal loaded in and on the matrix. As can be seen, changes in firing temperature can affect (e.g., increase) conductivity by a factor of 2 to 3 or more. Likewise, increasing the metal loading (per g/L of matrix) can also increase conductivity. For example, in some embodiments, a doubling of the weight loading in g/L of representative volume can at least double the conductivity in S/m. Further, geometric or dimensional properties of the composite structure 100, such as cell density (cpsi), wall thickness (μm), and average bulk porosity (% P) may also affect conductivity.

In either of the high or low temperature cases, the resulting composite structure 100 can have an electrical conductivity, e.g., as measured between opposing sides 113, 115 of the body 102, of 15 S/cm or more, 25 S/cm or more, and from 15 S/cm to 2,500 S/cm in some embodiments, from 15 S/cm to 300 S/cm or from 15 S/cm to 150 S/cm in other embodiments. The electrical conductivity can be tuned over a fairly broad range to target different conductivities for different heater apparatus applications and heater apparatus designs.

For instance, relatively higher conductivity, e.g., in the 1,000-2,500 S/cm range may be appropriate for the serpentine designs of FIGS. 1C and 1D. On the other hand, relatively low conductivity (e.g., less than 300 S/cm, less than 150 S/cm, or even less than 100 S/cm) may be useful for the embodiments of FIGS. 1A-1B and 6. In some applications, it may be desirable to have electrical conductivity of greater than 300 S/cm yet less than 1,000 S/cm in order to set an overall resistance of the heater that yields a target temperature or performance when driven by a given power source.

In some embodiments, the method 700 comprises a washcoating step in block 710, wherein after firing in block 708, a catalyst material is provided on the walls 104 and/or in the remaining open porosity 308, such as by dipping or any conventional catalyst coating method. After washcoating, the body 102 may be calcined, such as to a temperature of from 400° C. to 700° C., for example.

In some embodiments of the method 700, the final electrical conductivity of the composite structure 100 is tunable. The tunability can be accomplished by one or more of: choice of the particular material's chemical composition of the electrically conductive phase, adjusting a weight loading level of the electrically conductive phase per unit volume of a representative portion of the composite structure, and adjusting a degree of sintering of the electrically conductive phase, based on adjusting firing temperature and/or time (e.g., as described with respect to FIG. 9). Similarly, adjusting cell geometry of the walls 104, such as wall thickness (Tw), cell density in cells per square inch (cpsi), and/or adjusting average bulk porosity level (% P) of the base structure used to form the first phase 310, can also provide some adjustability.

In particular, the composition of the electrically conductive phase 312 can be changed to impart more or less resistivity to the electrically conductive phase, e.g., by selecting one of the various alloys as described herein. Additionally, the loading level of the electrically conductive phase 312 can be increased (relatively greater proportion with respect to the volume of the first phase 310) to impart increased electrical conductivity by virtue of there being a higher percentage of electrically conductive material in the composite structure. Macrostructure of the porous body 102 can also be adjusted to change absolute resistance of the composite body 100, such changing as wall thickness (Tw), cell density in cells per square inch (cpsi), or average bulk porosity (% P) of the first phase 310 and/or with respect to the unfilled portions of the porosity after the first phase 310 is infiltrated by the second phase 312. For example, increasing wall thickness (Tw) while keeping a constant metal loading may have the effect of lowering resistance by increasing total amount of the conductive phase in the body 102 (i.e., as the walls 104 become thicker, a greater number of electrical connections can be formed in the three-dimensional, continuous construct formed by the conductive phase 312). Increasing cell density (cpsi) may have the effect of lowering resistance. For example, as shown in FIG. 3A, concentrations of the conductive phase 312 in some embodiments collect at the intersections between the walls 104, which enables higher conductivity as the channels are made smaller and thereby the concentrations of conductive phase at the intersections are brought closer together in these embodiments. Since the physical structure of the conductive phase 312 is limited by the space available within the porosity of the first phase 310, increasing average bulk porosity (% P) and/or increasing the median pore size of the first phase 310 may have the effect of lowering resistance. For example, higher porosities and larger median pore sizes can facilitate the formation of cross-sectionally thicker and/or a greater number of electrical pathways to be formed by the conductive phase 312.

In some embodiments, as discussed above, where a catalyst metal material is also included in and/or on the walls 104 of the body 102 along with the electrically conductive material of the second phase 312, the catalyst metal material used can be a platinum group metal component that is selected from the group consisting of platinum, palladium, rhodium, ruthenium, iridium, and combinations thereof for example. In other embodiments, the catalyst metal material can be gold or silver. Other oxide catalyst materials such as oxides of aluminum, zeolite, ceria, lithium, magnesium, calcium, manganese, cobalt, nickel, copper, zinc, and silver can be included as part of the catalyst washcoat. In some embodiments, the catalyst oxide material of the washcoat can be a $SO_x$ sorbent component such as Mg or $MnO_2$, for example.

One example of the body 102, prior to addition of the electrically conductive material, includes high average bulk porosity in a range from 40% to 80%, median pore size of from 5 µm to 40 µm, a channel density of from 100 cpsi (31 cells/cm$^2$) to 600 cpsi (186 cells/cm$^2$), and a transverse wall thickness Tw (see FIG. 1B) of from 0.002 inch (0.051 mm) to 0.014 inches (0.36 mm). The electrically conductive metal can be a FeCrAl alloy, another Fe-containing alloy, or other electrically conductive material.

Figure 8:
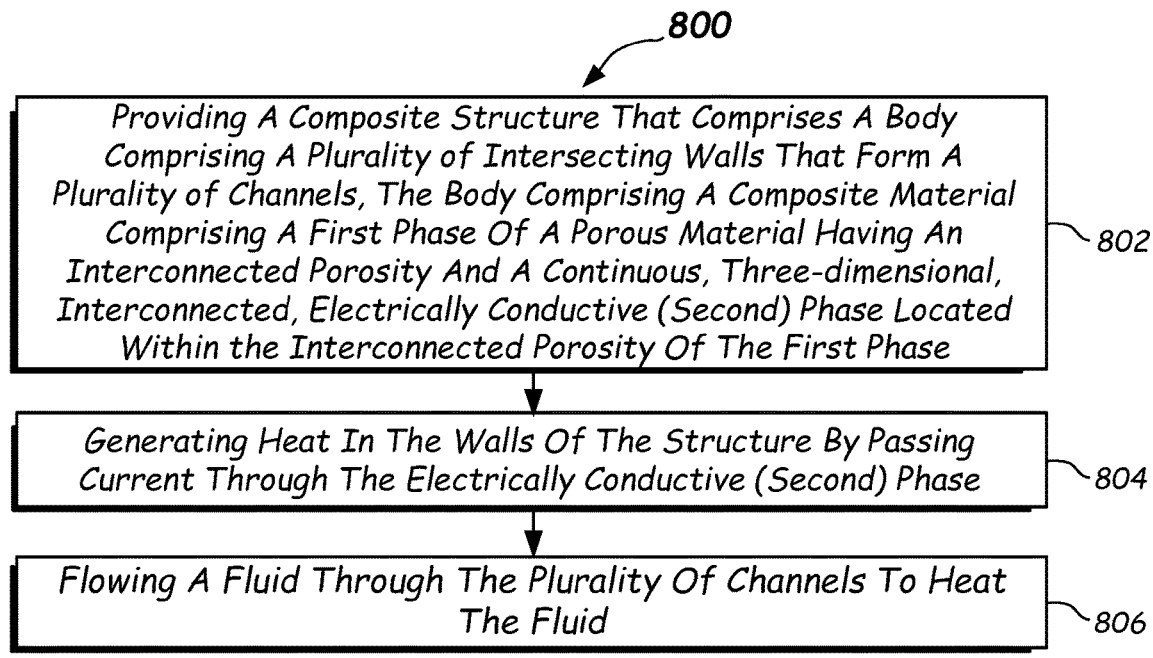
FIG. 8 illustrates a flowchart of a method of using a composite structure according to one or more embodiments of the disclosure.

As is shown in FIG. 8, a method 800 of using a composite structure as described herein as a heater element is provided. The method 800 includes, in block 802, providing a composite structure, comprising a body comprising walls that comprise a first phase of a glass or ceramic-containing material that comprises an internal interconnected porosity, and a continuous, three-dimensional, interconnected, electrically conductive phase located within the internal interconnected porosity.

The method 800 further includes, in block 802, generating heat with the continuous, three-dimensional, interconnected, electrically conductive phase. The generated heat of the continuous, three-dimensional, interconnected, electrically conductive phase can be to an internal temperature of greater than 250° C., or even greater than 450° C., for example. For example, the heat can be generated by applying a voltage across the composite structure, such as between a pair of electrodes (e.g., the electrodes 117) attached to the composite structure laterally (perpendicular to the axial direction) opposite to the each other. In some embodiments, the composite structure heats to an internal temperature of from 250° C. to 1,000° C.

Figure 2:
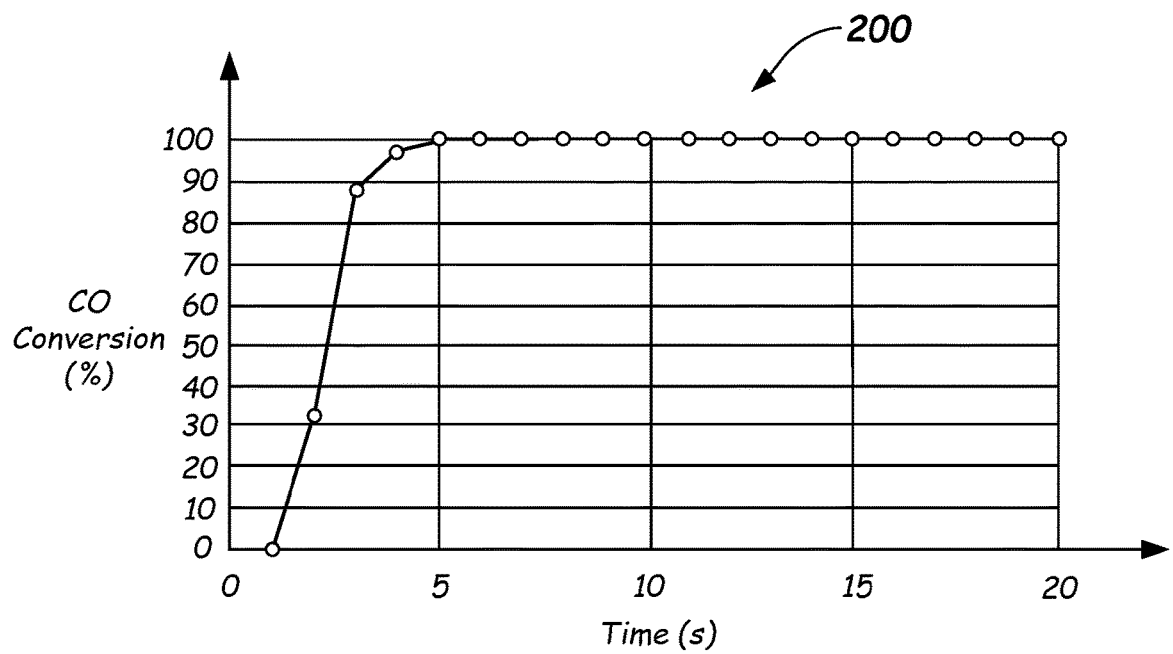
FIG. 2 schematically illustrates a graphical plot of CO conversion (%) as a function of time (seconds) for an exhaust aftertreatment system including a composite structure embodied as part of an exhaust heater, such as in shown in FIGS. 1A-1B.

In block 806, the method 800 includes flowing a fluid (e.g., exhaust gas containing one or more pollutants) through the plurality of channels 106, 606 to heat the fluid. The heating of the fluid can be sufficient to enable fast light-off in an adjacently-positioned catalyst substrate (e.g., catalyst substrate 425 or 602B shown in FIGS. 4 and 6 or other type of catalyst substrate). For example, fast light-off may be achieved in less than 20 seconds, less than 15 seconds, less than 10 seconds, less than 8 seconds, or even in less than 5 seconds from a beginning of gas flow, such as shown in FIG. 2. Light-off time can be further dependent on a number of factors including when the heater apparatus 101 is activated (e.g., could be preheated before engine ignition), the size of the heater apparatus 101, the power source wattage capability, the geometry (macrostructure) of the heater apparatus (efficiency of heat transfer), the engine heat output, the location of the catalyst substrate with respect to the engine's exhaust manifold (i.e., whether close coupled), and the thermal mass of the catalyst substrate.

In some applications, the heater apparatus 101, 101C, 101D is operated in a steady state condition (e.g., always on or intermittently on) where the power is supplied in a sufficient amount to aid in a regeneration event where soot is being burned out of an adjacent substrate embodied as a filter or catalyzed filter, such as in gasoline or diesel particulate filter applications.

In accordance with the embodiments disclosed herein, the method 800 of using the heater assembly comprising a composite structure of FIG. 8, can comprise simultaneously generating heat in block 804 and flowing the fluid in block 806 in order to heat the fluid with the heater. In some embodiments, the heat is generated in block 804 via resistive heating. For example, an electrical potential (e.g., electric potential V as shown in FIGS. 1B and 4) such as 12V, 48V, or other voltage, can be applied across a portion of the composite structure 100, such as between respective opposing sides 113, 115 of the composite structure 100 in these embodiments thus causing a desired amount of heating of composite body 100 and/or the fluid flowing through the composite body 100.

Figure 10A:
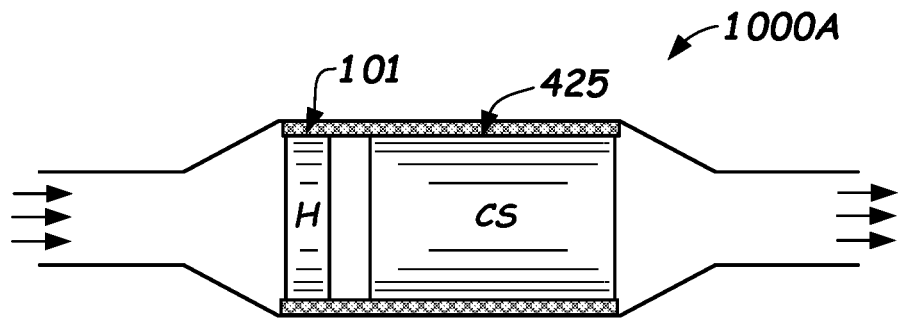
FIGS. 10A-10C schematically illustrate portions of exhaust aftertreatment systems comprising the composite structure embodied as part of a heater apparatus for heating an exhaust aftertreatment component according to one or more embodiments of the disclosure.

FIG. 10A schematically illustrates an exhaust aftertreatment system 1000A comprising a composite structure (e.g., the composite structure 100 embodied as part of a heater apparatus (H) 101 positioned upstream from a catalyzed substrate (CS) 425, which may be included as part of an exhaust aftertreatment system of a vehicle. Such an exhaust aftertreatment system 1000A can, for example, assist in providing fast light-off times for abatement of one or more constituents of the exhaust, such as CO, HC, $NO_X$, or $SO_X$, as described herein.

Figure 10B:
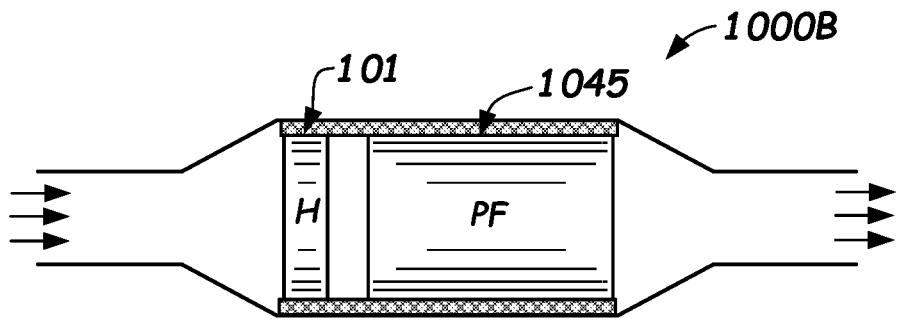

FIG. 10B schematically illustrates an exhaust aftertreatment system 1000B comprising a composite body embodied as the heater apparatus (H) 101 positioned upstream from a substrate embodied as a wall-flow particulate filter (PF) 1045 (e.g., having alternatingly plugged channels), which can be included as part of an exhaust aftertreatment system of a vehicle. Such an exhaust aftertreatment system 1000B can, for example, assist in providing improved regeneration of soot deposited in and on the walls of the particulate filter 1045 as described herein.

Figure 10C:
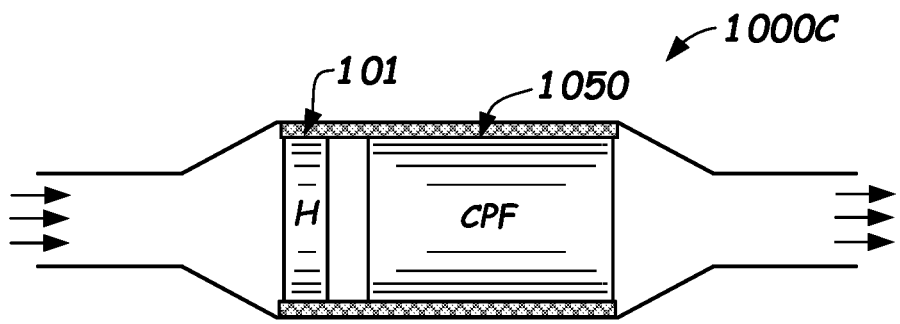

FIG. 10C schematically illustrates an exhaust aftertreatment system 1000C comprising a composite body embodied as the heater apparatus (H) 101 positioned upstream from a catalyzed, wall-flow particulate filter (CPF) 1050, which can be included as part of an exhaust aftertreatment system of a vehicle. Such an exhaust aftertreatment system 1000C can, for example, assist in providing improved regeneration of soot deposited in the catalyzed particulate filter 1050 and/or improved catalytic activity and fast light-off as described herein.

While embodiments of this disclosure have been disclosed in example forms, many modifications, additions, and deletions can be made therein without departing from the scope of this disclosure, as set forth in the claims and their equivalents.

What is claimed is:

1. A method of manufacturing a composite structure, comprising:
subjecting a base structure comprising a porous material to an electrically conductive particle-containing slurry to form a particle-loaded body by depositing the electrically conductive particles at least within the interconnected porosity; and
firing the particle-loaded body to sinter the electrically conductive particles together into a continuous, three-dimensional, interconnected, electrically conductive phase located within the interconnected porosity of the base structure,
wherein the base structure comprises a monolithic honeycomb body of the porous material and the monolithic honeycomb body comprises an array of intersecting walls that form a plurality of channels extending in an axial direction through the body such that adjacent channels are located on opposite sides of each wall, and each wall has a wall thickness that is defined between the opposite sides of that wall, and the wall thicknesses of a plurality of the walls extend in a lateral direction that is perpendicular with respect to the axial direction, and
wherein the electrically conductive particles, from which the electrically conductive phase is formed, are deposited sufficiently within the interconnected porosity such that the electrically conductive phase creates a continuous electrical path that extends in the lateral direction across the body by extending in the lateral direction through the wall thicknesses of the walls in the plurality of walls in the lateral direction perpendicular to the axial direction.

2. The method of manufacturing of claim 1, further comprising forming the monolithic honeycomb body by extruding a ceramic-forming mixture into a green body and firing the green body.

3. The method of manufacturing of claim 1, wherein the internal, interconnected porosity of the base structure, before depositing the particles, comprises: an average bulk porosity of the internal, interconnected porosity from 40% to 80% and a median pore size from 5 μm to 40 μm.

4. The method of manufacturing of claim 1, wherein the particles are deposited in an amount of at least 200 g/L with respect to a representative volume of the composite structure, wherein the representative volume is determined as a closed frontal area of the base structure multiplied by an axial length of the base structure.

5. The method of manufacturing of claim 1, further comprising firing the particle-loaded body to sinter the electrically conductive particles together into a continuous, three-dimensional, interconnected, electrically conductive phase located within the interconnected porosity of the base structure.

6. The method of manufacturing of claim 5, further comprising subjecting the plurality of channels to the electrically conductive particle-containing slurry multiple times followed by drying after each of the multiple times, wherein all the subjecting and drying occurs prior to firing.

7. The method of manufacturing of claim 1, wherein the electrically conductive particle-containing slurry contains conductive metal particles.

8. The method of manufacturing of claim 7, wherein the conductive metal particles have a median particle size of less than or equal to 25 μm.

9. The method of manufacturing of claim 1, wherein the composite structure comprises an electrical conductivity measured between opposing lateral sides in a direction perpendicular to an axial direction of greater than 25 S/cm.

10. The method of manufacturing of claim 1, further comprising firing of the particle-loaded body at a temperature from 1,200° C. to from 1,450° C. to sinter the electrically conductive particles.

11. The method of manufacturing of claim 1, wherein the electrically conductive phase incompletely fills the internal, interconnected porosity of the first phase and leaves residual open porosity in the walls.

12. The method of manufacturing of claim 1, wherein the electrically conductive material of the electrically conductive phase comprises an electrically conductive metal.

13. The method of manufacturing of claim 1, wherein the electrically conductive metal comprises an Fe-containing alloy an Fe-, Cr-, and Al-containing alloy, or a nickel-chromium containing alloy.

14. The method of manufacturing of claim 1, wherein the base structure constitutes from 25% to 90% of a solid volume of the composite structure, and the electrically conductive phase constitutes from 10% to 75% of the solid volume of the composite structure.

15. The method of manufacturing of claim 1, wherein the electrically conductive phase comprises greater than or equal to 10% of a solid volume of the composite structure.

16. The method of manufacturing of claim 1, wherein the particles are also deposited at least partially on outer surfaces of the base structure.

17. The method of manufacturing of claim 1, further comprising, after the firing, depositing a catalyst material on outer surfaces of the base structure, in an open porosity remaining in the interconnected porosity, or both.

18. The method of manufacturing of claim 1, wherein the porous material of the base structure comprises cordierite, aluminum titanate, alumina, silicon carbide, silicon nitride, mullite, sapphirine, spinel, calcium aluminate, zirconium phosphate, β-spodumene, β-eucryptite($LiAlSiO_4$), a cordierite-glass ceramic, fused silica, doped fused silica, or combinations thereof.

* * * * *